United States Patent [19]

Murata et al.

[11] Patent Number: 5,867,171
[45] Date of Patent: Feb. 2, 1999

[54] FACE IMAGE DATA PROCESSING DEVICES

[75] Inventors: Yoshiyuki Murata; Yoshito Yamaguchi, both of Ome, Japan

[73] Assignee: Casio Computer Co., Ltd., Tokyo, Japan

[21] Appl. No.: 896,642

[22] Filed: Jul. 18, 1997

Related U.S. Application Data

[62] Division of Ser. No. 749,730, Nov. 15, 1996, Pat. No. 5,818,457, which is a continuation of Ser. No. 245,464, May 18, 1994, abandoned.

[30] Foreign Application Priority Data

| May 25, 1993 | [JP] | Japan | 5-145640 |
| May 26, 1993 | [JP] | Japan | 5-146945 |

[51] Int. Cl.⁶ .................................................. G06F 15/00
[52] U.S. Cl. ........................................................... 345/435
[58] Field of Search .................................. 345/433, 435, 345/473, 474, 475

[56] References Cited

U.S. PATENT DOCUMENTS

| 4,276,570 | 6/1981 | Burson et al. | 364/518 |
| 4,791,581 | 12/1988 | Ohba | 364/518 |
| 4,885,702 | 12/1989 | Ohba | 364/518 |
| 5,057,019 | 10/1991 | Harvey et al. | 364/518 |
| 5,267,734 | 12/1993 | Stamper et al. | 273/434 |
| 5,818,457 | 7/1998 | Murata et al. | 345/435 |

FOREIGN PATENT DOCUMENTS

| 0 571 934 A2 | 1/1993 | European Pat. Off. . |
| 58-153895 | 9/1983 | Japan . |
| 58-153985 | 9/1983 | Japan . |
| 0170959 | 9/1984 | Japan . |
| 58-170959 | 9/1984 | Japan . |
| 0173869 | 10/1984 | Japan . |
| 58-173869 | 10/1984 | Japan . |
| 60-140473 | 7/1985 | Japan . |
| 6-277365 | 10/1994 | Japan . |
| 7-98104 | 10/1995 | Japan . |
| 7-98105 | 10/1995 | Japan . |
| 7-98106 | 10/1995 | Japan . |
| 2529573 | 6/1996 | Japan . |
| WO A 80 02490 | 11/1980 | WIPO . |
| WO 94/08311 | 4/1994 | WIPO . |

OTHER PUBLICATIONS

Proceedings ACM Multimedia 93 Proceedings of First ACM International Conference on Multimedia; 2 Aug. 1993, U.S.A., pp. 47–55, WU et al, "Facial Image Retrieval Identification and Inference System".

User's manual for "SimLife" Software Program, (1992) including Introduction, Reference and Tutorial.

User's manual for "Aquazone, Desktop Virtual Reality" (for Windows) with English translation of pertinent portions of document (1993).

User's Manual for "Aquazone, Desktop Virtual Reality" (for Macintosh) with partial English translation (1993).

"You can raise tropical fish in your Mac–Aquazone", published in *Asahi PasoCom*, May 15, 1996.

"DTVR Software–Aquazone" published in MyComputer, Jul. 1992.

*Primary Examiner*—Phu K. Nguyen
*Attorney, Agent, or Firm*—Frishauf, Holtz, Goodman, Langer & Chick, P.C.

[57] ABSTRACT

A face image data processing device which processes data on a face image to create the face image suitable for an age and presumes the age of the created face image on the basis of same. In response to designation of data on an age by an age designating unit, respective part images corresponding to the designated age data are read from a storage. A face image composed of a combination of the read part images and suitable for the designated age data is created, and displayed or printed. The age of the created face image is presumed from the created face image by an age presumption section. The presumed age is displayed/printed along with the associated face image.

18 Claims, 28 Drawing Sheets

FIG.5B

| FACE CHARACTERISTIC DATA | | | |
|---|---|---|---|
| a : SEX | b : PART NO. | c : PATTERN NO. | d : AGE |
| 1(MALE) | 1(1 ~ 6) | 01(01 ~ 50) | 30(10 ~ 100) |

FIG.9A

```
SEX ?
01 : MALE
02 : FEMALE
```
11

FIG.9B

```
HAIR STYLE ?
01 : THICK HAIR PARTED AT 7:3
02 : THIN HAIR PARTED AT 7:3
```
11

FIG.9C

```
CONTOUR ?
01 : ROUND
02 : RECTANGULAR
03 : · · · ·
```
11

FIG.9D

```
AGE ?
```
11

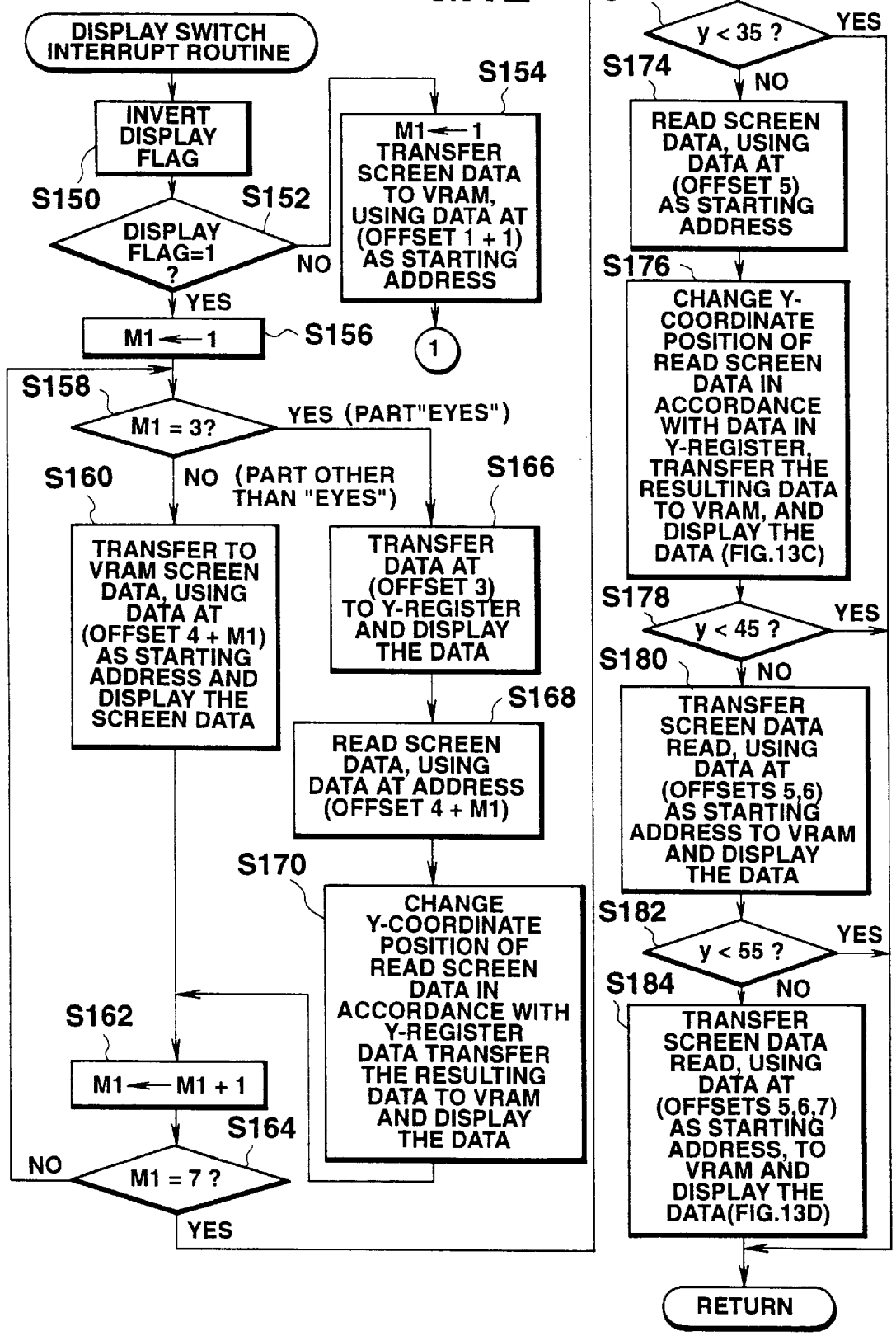

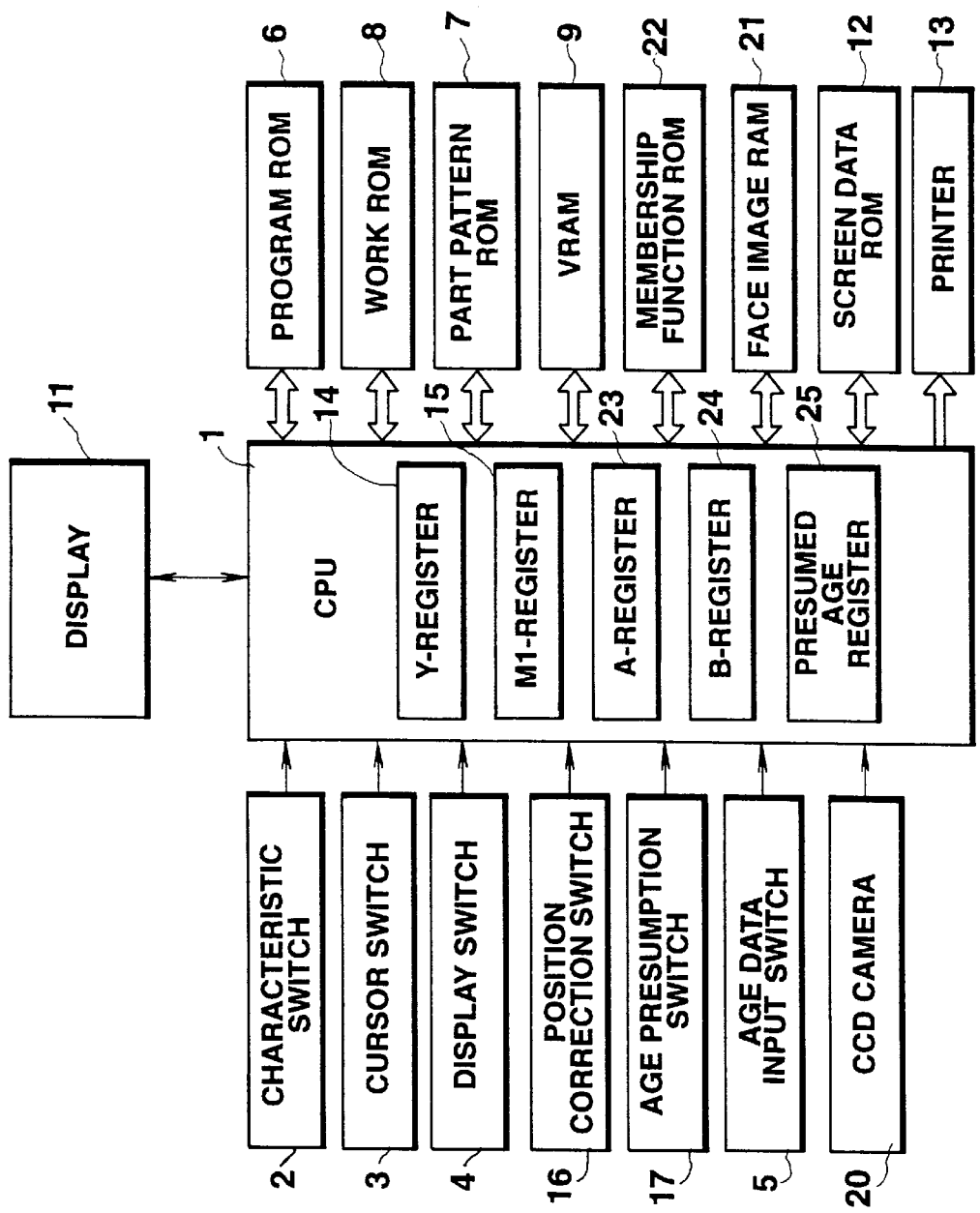

FIG.15

WORK RAM

| Offset | Contents |
|---|---|
| OFFSET 1 + 1 | ADD 1 (M1=1) |
| OFFSET 1 + 2 | ADD 2 (M1=2) |
| ⋮ | ⋮ |
| OFFSET 1 + 6 | ADD 6 (M1=6) |
| OFFSET 1 + 7 | ADD 7 (M1=7) |
| OFFSET 1 + 8 | ADD 7 (M1=8) |
| ⋮ | ⋮ |
| OFFSET 2 + 1 | CURSOR POSITION (M1+1) |
| OFFSET 2 + 2 | CURSOR POSITION (M1+2) |
| ⋮ | ⋮ |
| OFFSET 2 + 6 | CURSOR POSITION (M1+6) |
| OFFSET 2 + 7 | CURSOR POSITION (M1+7) |
| OFFSET 3 | ACTUAL AGE |
| OFFSET 4 + 1 | (HAIR STYLE) |
| OFFSET 4 + 2 | (CONTOUR) |
| OFFSET 4 + 3 | (EYES) |
| OFFSET 4 + 4 | (EYEBROWS) |
| OFFSET 4 + 5 | (NOSE) |
| OFFSET 4 + 6 | (MOUTH) |

FACE IMAGE DATA PROCESSING DEVICES

This is a division of application Ser. No. 08/749,730 filed Nov. 15, 1996, now U.S. Pat. No. 5,818,457, which is a Continuation of application Ser. No. 08/245,464, flied May 18, 1994 (now abandoned).

BACKGROUND OF THE INVENTION

The present invention relates to face image data processing devices which create a face image data suitable for an age and presume the age of a created face image on the basis of same.

Conventionally, a face image creation device is known which selects desired patterns of respective parts (for example, eyes, eyebrows, mouth, etc.,) which compose a face and have any respective shapes from among a plurality of sets of different patterns for each of the parts prepared beforehand, and combines those selected patterns into a face image. Thus, this process requires much time and special skills for the creation of the face image.

SUMMARY OF THE INVENTION

It is therefore an object of the present invention to provide a face image creation device capable of creating a face image similar to a target face.

It is another object of the present invention to provide a face image creation device capable of creating a desired face image rapidly and easily.

It is still another object of the present invention to provide an age presuming device capable of presuming the age of a created face image on the basis of same.

In order to achieve the above objects, the present invention provides a face image creation device including: storage means for a face image; age designating means for designating age data on an age; and face image producing means for changing the face image stored in said storage means, in correspondence to the age data designated by the age designating means, to produce a face image corresponding to the age data. The face image creation device may further include face image outputting means, for example, display means or printing means, for outputting a face image produced by the face image producing means.

Thus, according to the present invention, a face image suitable for a designated age is created easily and rapidly without requiring any special skills.

In order to achieve the above objects, the present invention provides a face image creation device including: face characteristic detecting means for detecting a face characteristic from a face image; age presuming means for performing required inference on the basis of the face characteristic detected by the face characteristic detecting means and presuming the age of the face image on the basis of the result of the inference. The present invention also provides a face image creation device further including: output means, for example, display means or printing means, for outputting age data on the age presumed by the age presuming means.

Thus, according to the present invention, the age of a face image is presumed easily and rapidly from the face image without requiring any special skills.

BRIEF DESCRIPTION OF THE DRAWINGS

FIG. 5B shows an illustrative arrangement of data stored at face characteristic data locations in the work RAM.

FIGS. 9A–9D show illustrative screen data.

FIG. 12 is a flowchart indicative of a display switch interrupt routine.

FIG. 14 shows the whole circuit structure of an age presuming device according to a second embodiment of the present invention.

FIG. 15 shows an illustrative arrangement of data stored in a work RAM in the second embodiment.

DESCRIPTION OF THE PREFERRED EMBODIMENTS

Embodiments of the present invention will be described below with respect to the accompanying drawings.

First Embodiment

Figure 1:
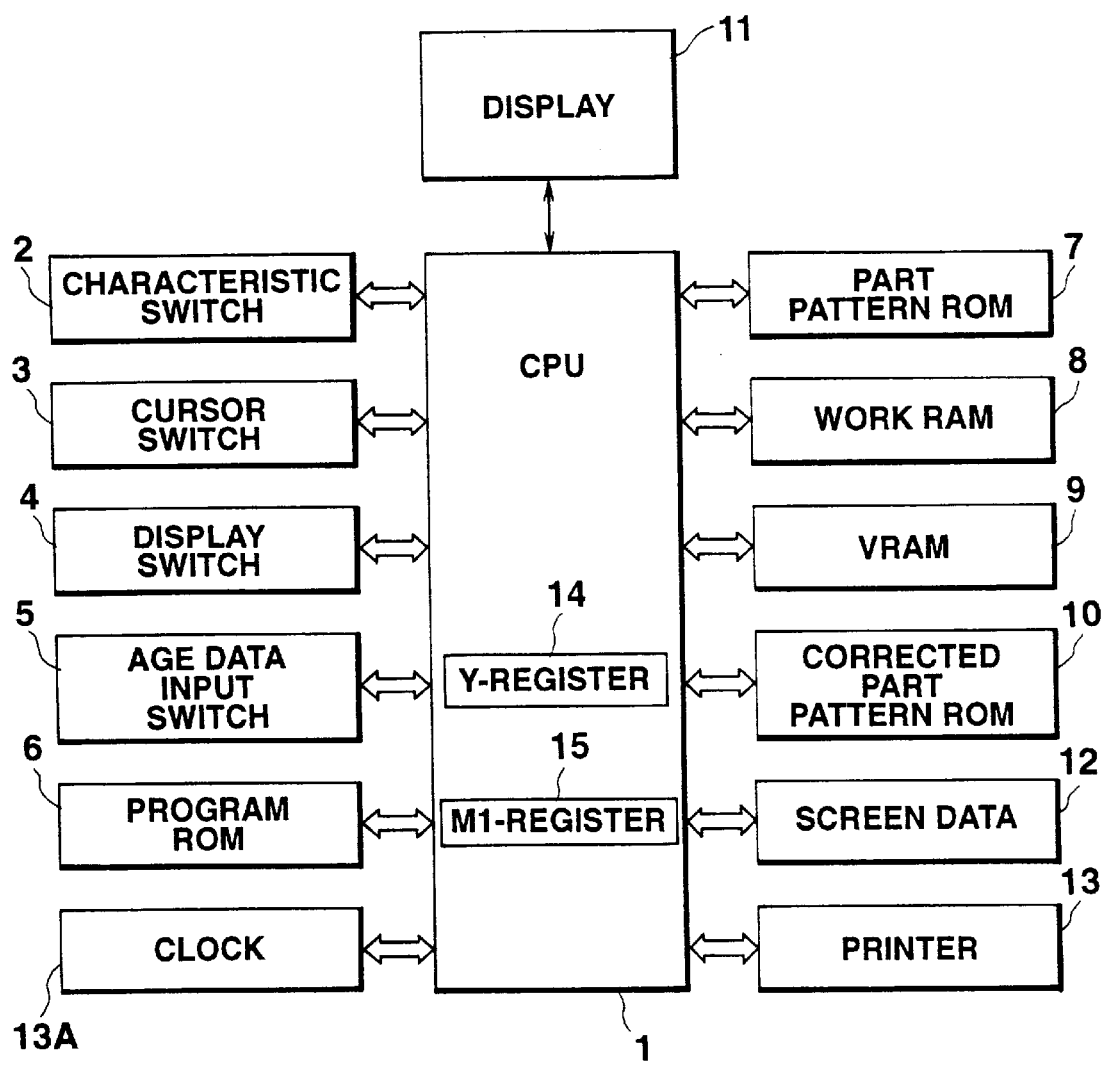
FIG. 1 shows the whole circuit structure of a face image creation device according to a first embodiment of the present invention.

FIGS. 1–13D show a first embodiment of the present invention. FIG. 1 shows the whole circuit structure of a face image creation device as the first embodiment.

In FIG. 1, the face image creation device includes a CPU 1, a characteristic switch 2, a cursor switch 3, a display switch 4, an age data input switch 5, a program ROM 6, a part pattern ROM 7, a work RAM 8, a VRAM 9, a corrected part pattern ROM 10, a display 11, and a screen data ROM 12.

The CPU 1 controls the whole face image creation device. When the characteristic switch 2, cursor switch 3, display switch 4, and age data input switch 5 designate face part patterns, characteristics, and an age, the CPU 1 responds to that designation to read and combine data on patterns of the respective parts of a face from the part pattern ROM 7 and the corrected part pattern ROM 10 in accordance with program data stored in the program ROM 6 and part data stored in the work RAM 8 to thereby create the user's or another's face image conforming to the designated age.

The characteristic switch 2 is operated to display a screen which selects data on the sex of a person having a face image (FIG. 9A), a screen which selects data on face characteristics indicative of the characteristics of the respective parts (hair style, contour, eyebrows, eyes, nose, and mouth) of the face (FIGS. 9B, 9C) and a screen which selects data on the age of the person (FIG. 9D), in order to create the face image.

The cursor switch 3 is operated to select any one from among data on the sex and data on the respective face characteristics of the screen data displayed already on the display 11 by the operation of the characteristic switch 2, in order to create the face image. Each time the cursor switch 3 is operated, the cursor K is moved up or down on the screen of the display 11 to thereby select data corresponding to the position where the cursor has moved. In the present embodiment, when the cursor switch 3 is operated, one of numerals "01", "02", . . . annexed to the corresponding screen data items responds to the operation of the cursor switch 3 to be displayed in a going-on/off manner, as shown in FIGS. 9A–9C. Alternatively, a mouse may be used to select desired data in place of the cursor switch 3.

The display switch 4 is operated to display stored face image data on the display 11.

The age data input switch 5 is operated to input data on an age while viewing an age data screen (FIG. 9D) displayed on the display 11 by the characteristic switch 2. While in the present embodiment the age data indicates an actual age, the age data may be replaced with data on the date of the person's birth, and data on the age of the person any particular years ago or hence.

The program ROM 6 stores a control program for the CPU 1, the contents of which program will be shown later in FIGURES concerned.

Figure 2:
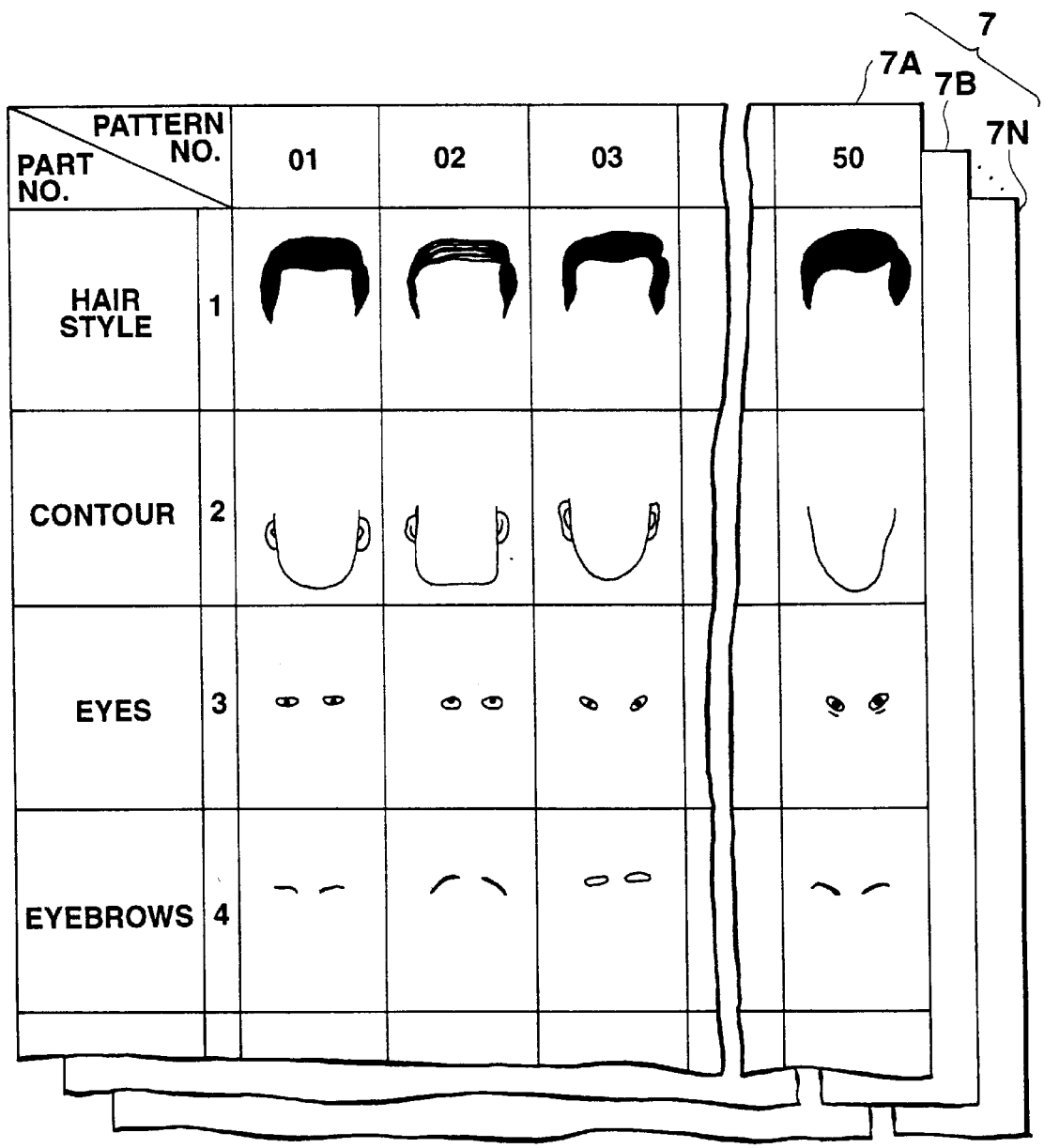
FIG. 2 shows an illustrative arrangement of part patterns of each of faces, data on which is stored in a part pattern ROM.
Figure 3:
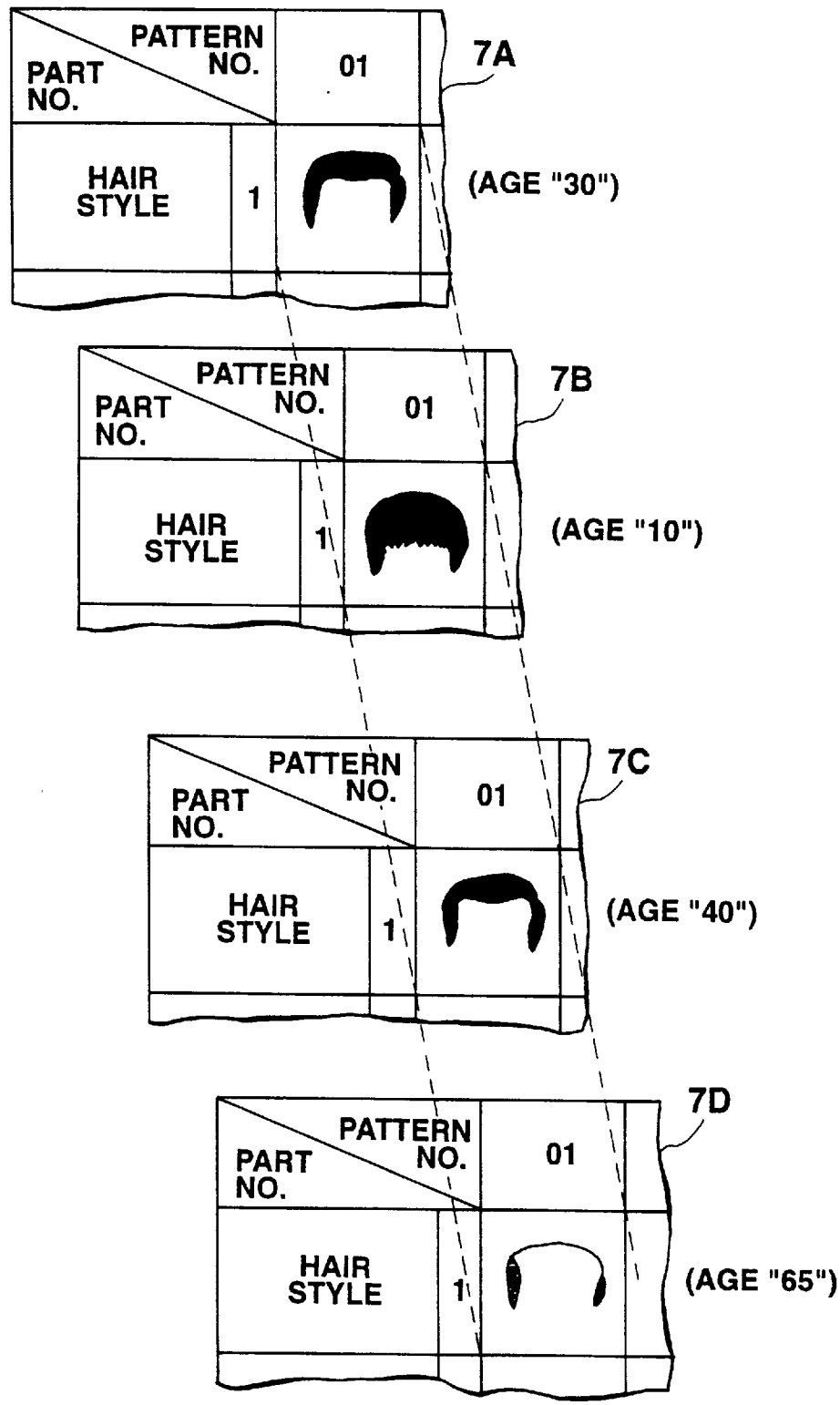
FIG. 3 shows an illustrative part pattern of each of faces, data on which is stored, for the respective ages in the corresponding age part pattern ROMs.

As shown in FIGS. 2 and 3, the part pattern ROM 7 is composed of a plurality of age part pattern ROMs 7A–7N one for each age. When data on an age is inputted by the age data input switch 5, the corresponding one of the age part pattern ROMs 7–7N is designated. In this embodiment, as shown in FIG. 3, the age part pattern ROM 7A is for thirty years of age; the age part pattern ROM 7B is for ten years of age; the age part pattern ROM 7C is for forty years of age; and the age part pattern ROM 70 is for 65 years of age.

The part pattern ROMs 7A–7N each store data on kinds of part patterns of each of the parts of a face image. In the present embodiment, the number of kinds of parts of the face is N; i.e., N=1 denotes a part "hair style" for a face; N =2 denotes a part "contour" of the face; N=3 denotes a part "eyes" in the face; N=4 denotes a part "eyebrows" in the face; N=5 denotes a part "nose" in the face; N=6 denotes a part "mouth" in the face. The present invention is not limited to the example of FIG. 2, but may include other parts such as a trunk, arms, hands, and legs. The age part pattern ROMs 7A–7N are prepared at intervals of five years of age in this embodiment, but they may be prepared at intervals of one year of age.

As shown in FIG. 2, data items on the kinds of part patterns of each of the parts are stored in correspondence to data items on the pattern numbers in the part pattern ROM 7. For example, in the case of the part "hair style" for N=1, data items on 50 kinds of different part patterns for "hair style" are stored beforehand along with the corresponding data items on numbers "01"–"50". The part patterns of the same number in the respective age part pattern ROMs 7A–7N are of the same type. For example, the respective part patterns of the same number "01" for the part "hair style" in FIG. 3 are of the same "parted-at-7:3 (or at-the-side) hair style" type.

Similarly, data items on part patterns of each of other parts "contour", "eyes", and "eyebrows" of the face are stored beforehand in correspondence to data items on pattern numbers "01"–"50".

The corrected part pattern ROM 10 beforehand stores data on face characteristics suitable for the respective ages.

Figure 4:
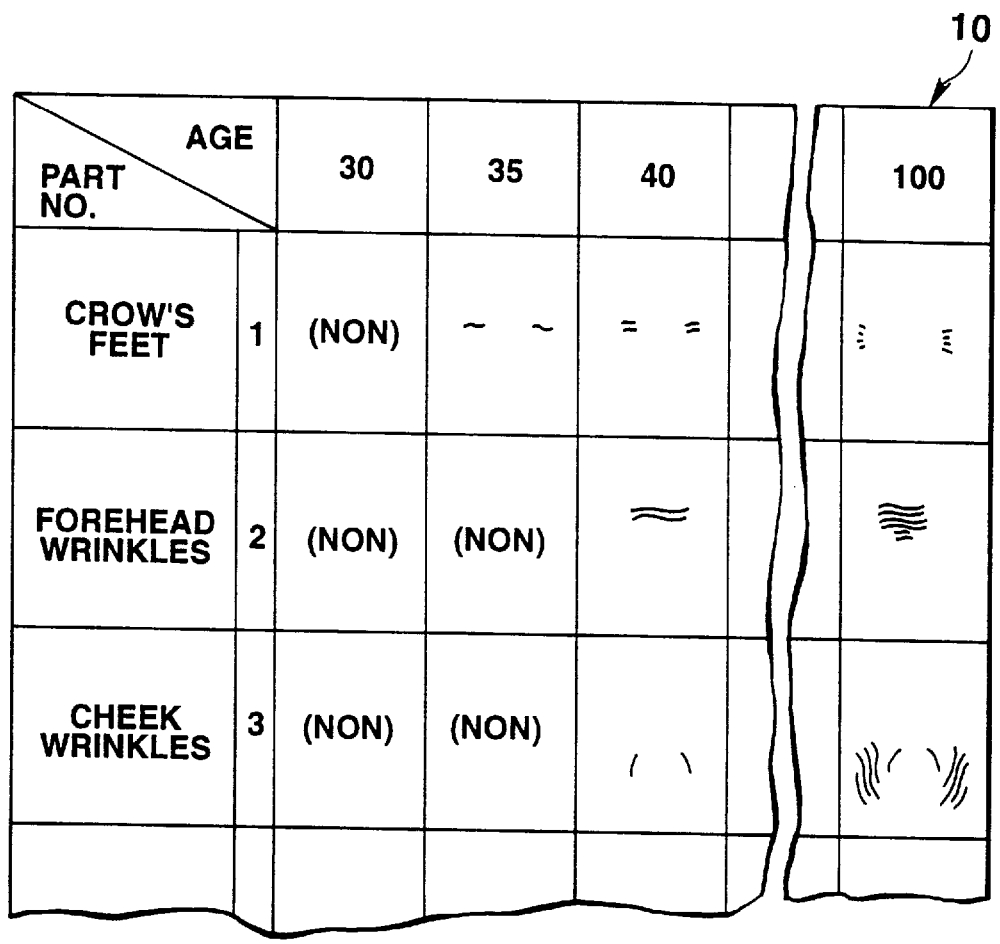
FIG. 4 shows an illustrative arrangement of part patterns for wrinkles, data on which is stored, in a corrected part pattern ROM.

FIG. 4 illustratively shows an arrangement of part patterns for "wrinkles" alone on a face, data on which patterns is stored in the corrected part pattern ROM 10. The ROM 10 stores as wrinkle part patterns data on part patterns each having the "number of wrinkles"suitable for an age.

In FIG. 4, the vertical axis shows kinds of wrinkles which include "crow's feet", "forehead wrinkles", "cheek wrinkles", etc., indicative of the characteristics of each face while the horizontal axis shows data on ages, which, in this embodiment, increase at intervals of five years from 30 years of age to 100 years of age.

Beforehand stored in the corrected part pattern ROM 10 are data items on "wrinkle" part patterns where the number of wrinkles correspond with age.

Figure 5A:
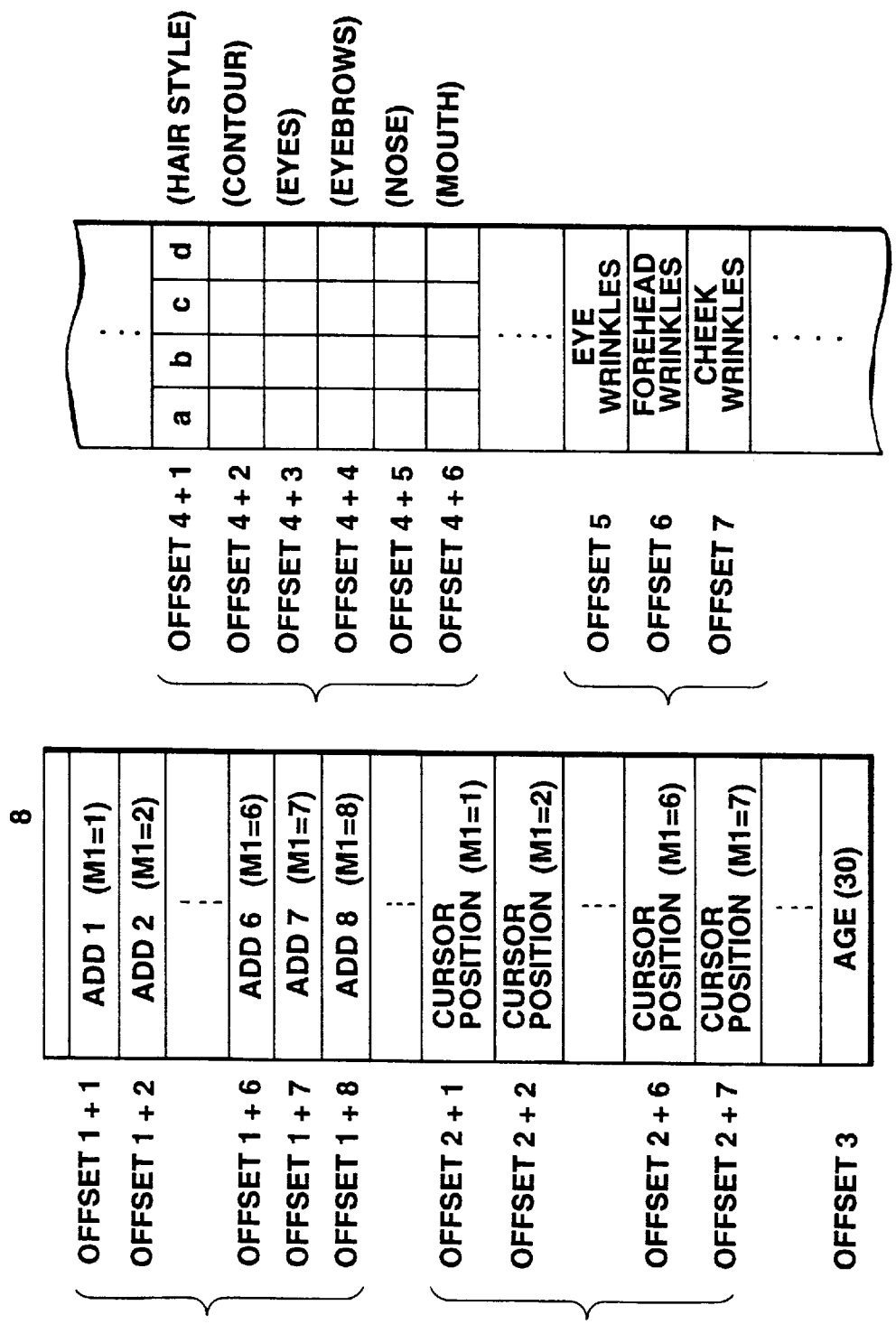
FIG. 5A shows an illustrative arrangement of data stored at data storage locations in a work RAM.
Figure 6:
FIG. 6 shows an illustrative arrangement of screen data stored in a screen data ROM.

As shown in FIG. 5A, the work RAM 8 is used as a work area when the CPU 1 performs various controlling operations. Various data items are stored at respective storage locations corresponding to addresses (OFFSET1+1) to (OFFSET7) in the work RAM 8. More particularly, respective address data ADD1–ADD8 to designate selected screen data of FIG. 6 are stored at selected screen locations corresponding to addresses (OFFSET1+1) to (OFFSET1+ 8). Data items on the positions of the operated cursor switch 3 are stored at cursor position locations corresponding to addresses (OFFSET2+1) to (OFFSET2+7). A data item on an age is stored at an age location corresponding to an address (OFFSET3).

Figure 5C:
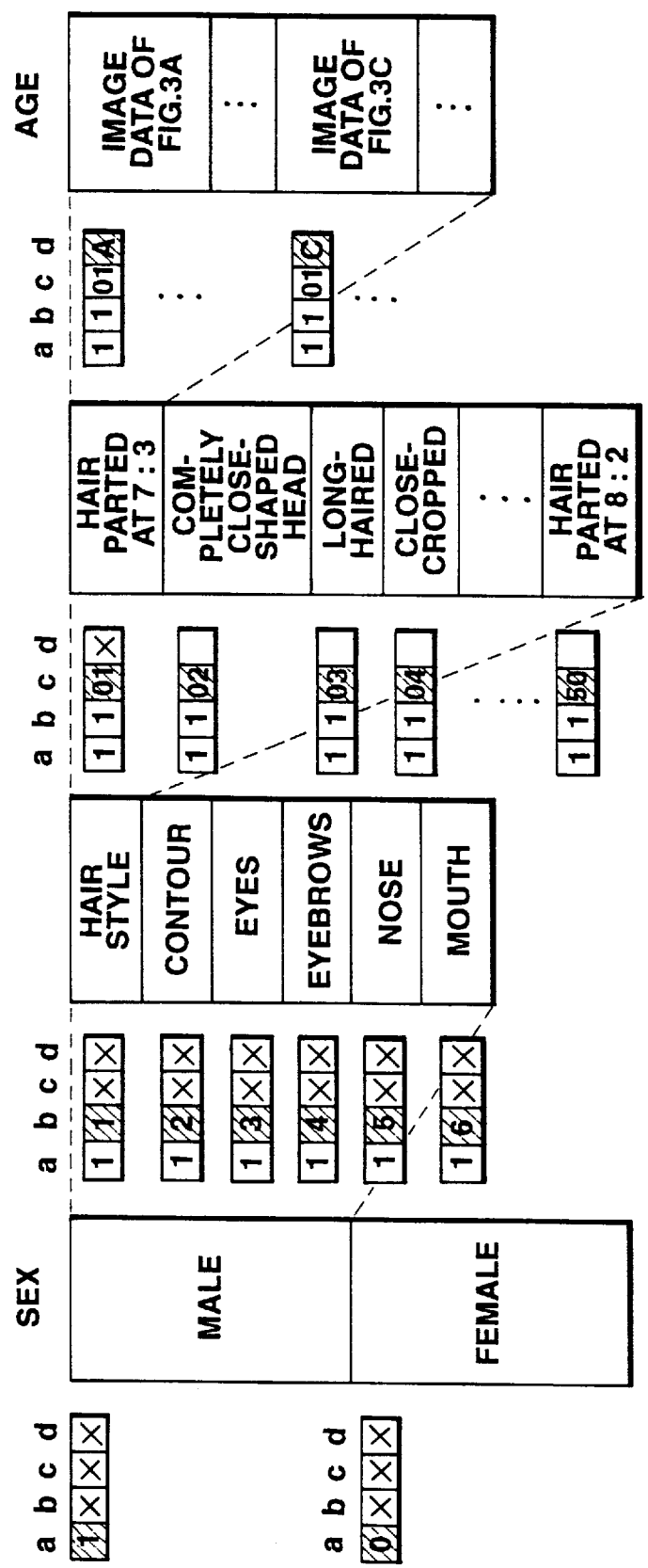
FIG. 5C shows the relationship between data on face characteristic data stored at face characteristic data locations in the work RAM and corresponding sexes, parts and ages designated by the face characteristic data.

Data items on face characteristics for the respective parts are stored at face characteristic data locations corresponding to addresses (OFFSET4+1) to (OFFSET4+6). As shown in FIG. 5B, the respective data items on the face characteristics are composed of a plurality of bits where the most-least significant bits indicate corresponding sex, part number, part pattern number and age data items in this order. FIG. 5C show the relationship between those sex, part number, part pattern number and age data items, and image data items on a sex, parts, part patterns, and an age designated by those corresponding data items.

The sex data items are stored at a sex data location (designated by a) for the most significant bit. It is composed of one bit. As shown in FIG. 5C, when it is "1", it indicates a male while when it is "0", it indicates a female.

The part number data item is stored at each of part number locations (designated by b) for the second bit. As shown in FIG. 5C, the part number data is selected by the user from among data items on part numbers "1"–"6" corresponding to six kinds of parts "hair style", "contour", . . .

The part pattern number data item is stored at a part pattern number location (designated by c) for the third bit. The part pattern number data item is selected by the user from among data items on the part pattern numbers "01"–"50" in the part pattern ROM 7. For example, as shown in FIG. 5C, if a part pattern for a "thick-haired parted-at-7:3 hair style" is selected by the user, data on a part pattern number "01" corresponding to the part pattern is stored.

The age data item is stored at an age location (designated by d) for the least significant bit. As shown in FIG. 5C, when the age data item is "A", it indicates thirty years of age (FIG. 3A). When the age data item is "B", it indicates ten years of age (FIG. 3B). When the age data items are "C", "D", . . . , they indicate corresponding forty years of age, sixty-five years of age, . . . (FIGS. 3C, 3D).

Address data items for wrinkles on a face: that is, respective crow's feet, forehead wrinkles, cheek wrinkles are stored at wrinkle locations corresponding to addresses (OFFSET5)–(OFFSET7).

As shown in FIG. 6, the screen data ROM pre-stores screen data displayed on the display 11 when a face image is created. The data items in the screen ROM are designated by respective address data items ADD1–ADD8 for screen data stored at addresses (OFFSET1 +1)–(OFFSET1+8) in the work RAM 8.

In FIG. 6, a screen data item used for the screen when a sex is selected is stored at a location corresponding to the address ADD1. As shown in FIG. 9A, a screen which urges the user to designate a sex in response to "sex ?", "01: male" and "02: female" on the basis of the screen data is displayed on the display 11.

In FIG. 6, a screen data item used for the screen when a kind of hair style is selected is stored at a location corresponding to address ADD2 of FIG. 6. As shown in FIG. 9B, a screen which urges the user to select a kind of hair style on the basis of the screen data item is displayed on the display 11.

Similarly, screen data items used for the screen when the respective parts "contour", "eyes", "eyebrows", "nose" and mouth" of the face are selected and when age data is input are stored at locations corresponding to addresses ADD3–ADD8. A screen which urges the user to select respective parts "contour", "eyes", "eyebrows", "nose" and mouth" of the face and to input age data on the basis of the display screen data is displayed on the display 11 (FIGS. 9C, 9D).

The VRAM 9 stores data on the part patterns of a face image in units of a screen when the face image is created and uses a semiconductor memory, for example, as the VRAM 9.

The display 11 displays a face image, etc., processed under control of the CPU 1. The display 11 displays a face image and various data items while delivering various data to/from the VRAM 9 and the CPU 1. It may be composed of a TV display, a dedicated monitor, a CRT or a LCD.

The operation of the first embodiment will be described below.

In this embodiment, two different methods of creating and displaying a face image can be performed. The first method includes the steps of inputting any age data by the operation of the age data input switch 5, selecting a part pattern of each of the parts of the face designated by the operation of the cursor switch 3 from among a plurality of part patterns, and combining those selected part patterns into a face image suitable for the input age data, and displaying the face image.

The second method includes the steps of inputting age data different from any age data in accordance with which a face image has been created, as mentioned above, replacing at least one of the already created part patterns with a related part pattern or a further part pattern having the same characteristic as the related part pattern in accordance with the input different age data, changing the positions of patterns of the part "eyes", etc., adding part patterns such as a part pattern "wrinkles" to those part patterns as required to automatically create a face image suitable for the different age data, and displaying that face image.

Figure 7:
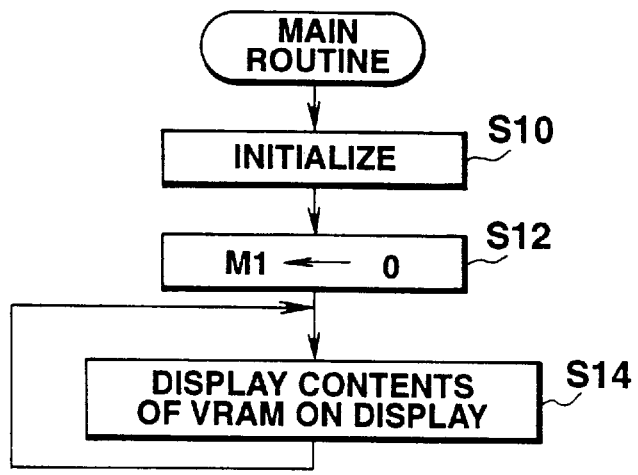
FIG. 7 is a flowchart indicative of a main program for a face image creation process in the first embodiment.

The respective steps of the method of creating a face image suitable for a particular age will be described below. FIG. 7 is a flowchart indicative of a main program for a face image creation process. When the program for this process starts, initialization is performed at step S10 in which the various registers and VRAM 9 are cleared; subroutines are initialized; and the flags are reset. As shown in FIG. 7, at the same time, various data items are stored as initial data at storage locations corresponding to addresses (OFFSET1+1)–(OFFSET7) in the work RAM 8.

That is, 8 kinds of address data items ADD1–ADD8 for designation of respective screen data items are stored at selected image locations corresponding to addresses (OFFSET1+1)–(OFFSET1+8). Position data items corresponding to the beforehand initially set positions of the cursor K are stored at cursor position locations corresponding to addresses (OFFSET2+1)–(OFFSET2 +7). An age data item initially set beforehand (in the present embodiment, beforehand initially set age data item corresponding to 30 years of age in this embodiment) is stored at an age location corresponding to address (OFFSET3). Face characteristic data items on the respective parts are stored at face characteristic data locations corresponding to addresses (OFFSET4+1)–(OFFSET4+6). The face characteristic data is composed of sex, part number, part pattern number and age data items which are beforehand initially set, so that those respective data are stored. In the case of this embodiment, data stored at the face characteristic data locations when the initial setting is made includes sex data which is "01" indicative of a male; part number data which is "1" indicative of a hair style; part pattern number data which is "01" indicative of part pattern number data; and age data indicative of "thirty years of age".

Address data items each to designate data items on crow's feet, cheek wrinkles, and forehead wrinkles suitable for, for example, thirty years of age, are stored at wrinkle data locations corresponding to addresses (OFFSET5)–(OFFSET7).

At step S12 the value of a pointer M1 register 15 provided in the CPU 1 is cleared to "0". The pointer M1 register 15 is used to designate and input a total of 8 data items on sex, parts indicative of the respective characteristics of a face, and an age.

At step S14 the contents of the VRAM 9 are displayed on the display 11. Data items on the respective part patterns stored in the part pattern ROM 7 are read on the basis of the sex, part number, part pattern number and age data items as the face characteristic data stored at present in the work RAM 8.

More specifically, one of the age part pattern ROMs 7A–7N is selected on the basis of sex and age data items, and data items on the patterns of parts stored in one of the age part pattern ROMs 7A–7N are read on the basis of part number and part pattern number data items. Data on a face image composed of a combination of the part patterns, data on which has been read, is stored in the VRAM 9, the contents of which data are displayed on the display 11. Thus, a face image based on the respective data items set initially in the work RAM 8 at step S10 is displayed on the display 11 at the time of the initial setting; a half-finished face image is displaced during formation of the face image; and a finished face image after creation is displayed on the display 11 after creation of the face image.

Thereafter, the step S14 is iterated to perform a required process on the basis of an interrupt signal from a respective one of the switches. Processes for selection of the respective patterns are all performed in interrupt routines indicated below.

Figure 8:
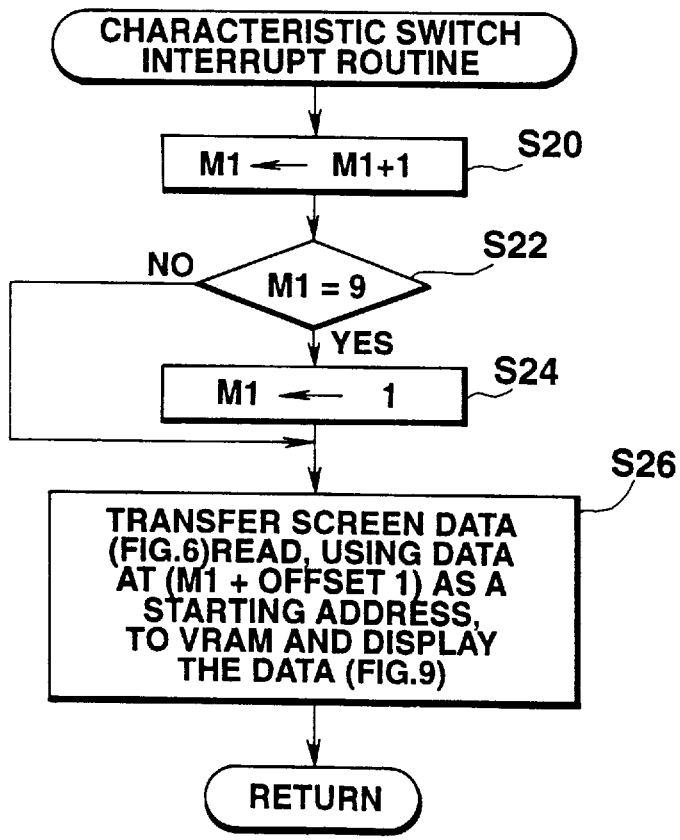
FIG. 8 is a flowchart indicative of a characteristic switch interrupt routine.

FIG. 8 is a flowchart indicative of a characteristic switch interrupt routine, which is executed each time the character switch 2 is operated. Each time the character switch 2 is operated, the contents of the screen data are changed sequentially as shown in FIGS. 9A–9D. The user selects face characteristic data items on a sex, hair style, eyes, eyebrows, . . . , and inputs an age data item while viewing the screen of FIGS. 9A–9D.

When the characteristic switch 2 is first operated, the value of the pointer M1 register 15 is incremented by "1" at step S20. At step S22 it is determined whether the value of the register 15 is "9" since the face characteristic data is composed of a total of eight data items on one sex, six kinds of parts and one age.

When it is determined at step S22 that the value of the pointer M1 register 15 is not equal to "9", control passes to step S26, where image data read from screen data ROM 12, using as the starting address data at address (M1+OFFSET1) in the work RAM 8, is transferred to the VRAM 9.

When it is determined at step S22 that the current value of the pointer M1 register 15 is equal to "1", control passes to step S26, where screen data read from the work RAM 8, using as the start address data at address (M1+OFFSET1) in the work RAM 8, is transferred to the VRAM 9. In this case, data at address (M1+OFFSET1) in the work RAM 8 is ADD1, the contents of which are sex selection screen data, as shown in FIG. 6. Thus, a screen which urges the user to designate a sex in response to "sex ?" and designated one of "01: a male" and "02: a female" on the basis of sex selection screen data is displayed on the display 11, as shown in FIG. 9A.

When the characteristic switch 2 is again operated, the value of the pointer M1 register 15 is "2" at step S20. Thus, since at step S22 it is determined that the current value of the register 15 is "2", at step S26 screen data (used on the screen when a hair style is selected) corresponding to address ADD2 of FIG. 6 is transferred to the VRAM 9. Thus, a display screen which urges the user to select a hair style in accordance with "hair style ?", "01: a thick-haired parted-at-7:3 hair style", "02: thin-haired parted-at-7:3 hair style", . . . on the basis of the screen data is displayed on the display 11, as shown in FIG. 9B. Each time the characteristic switch 2 is operated sequentially, at step S20 the value of the register 15 is sequentially incremented. As a result, when it is determined at step S22 that the value of the register 15 is "9", control passes to step S24, where the value of the resister 15 is returned to "1". Thereafter, control passes to step S26, where the screen data stored in the screen data ROM 12 is again transferred to the VRAM 9, using as the starting address data at address (1+OFFSET1) in the work RAM 8. Thereafter, each time the characteristic switch 2 is operated, the value of the register 15 is incremented by one such that the screen data at (M1+OFFSET1) is transferred to the VRAM 9 to thereby display that screen data on the display 11.

In this way, each time the characteristic switch 2 is operated, the screen data is sequentially changed (FIGS. 9A–9D). As a result, the user selects or inputs sex data, data on face characteristics such as hair style, eyes, and eyebrows and age data while viewing a selected screen changed sequentially.

Figure 10:
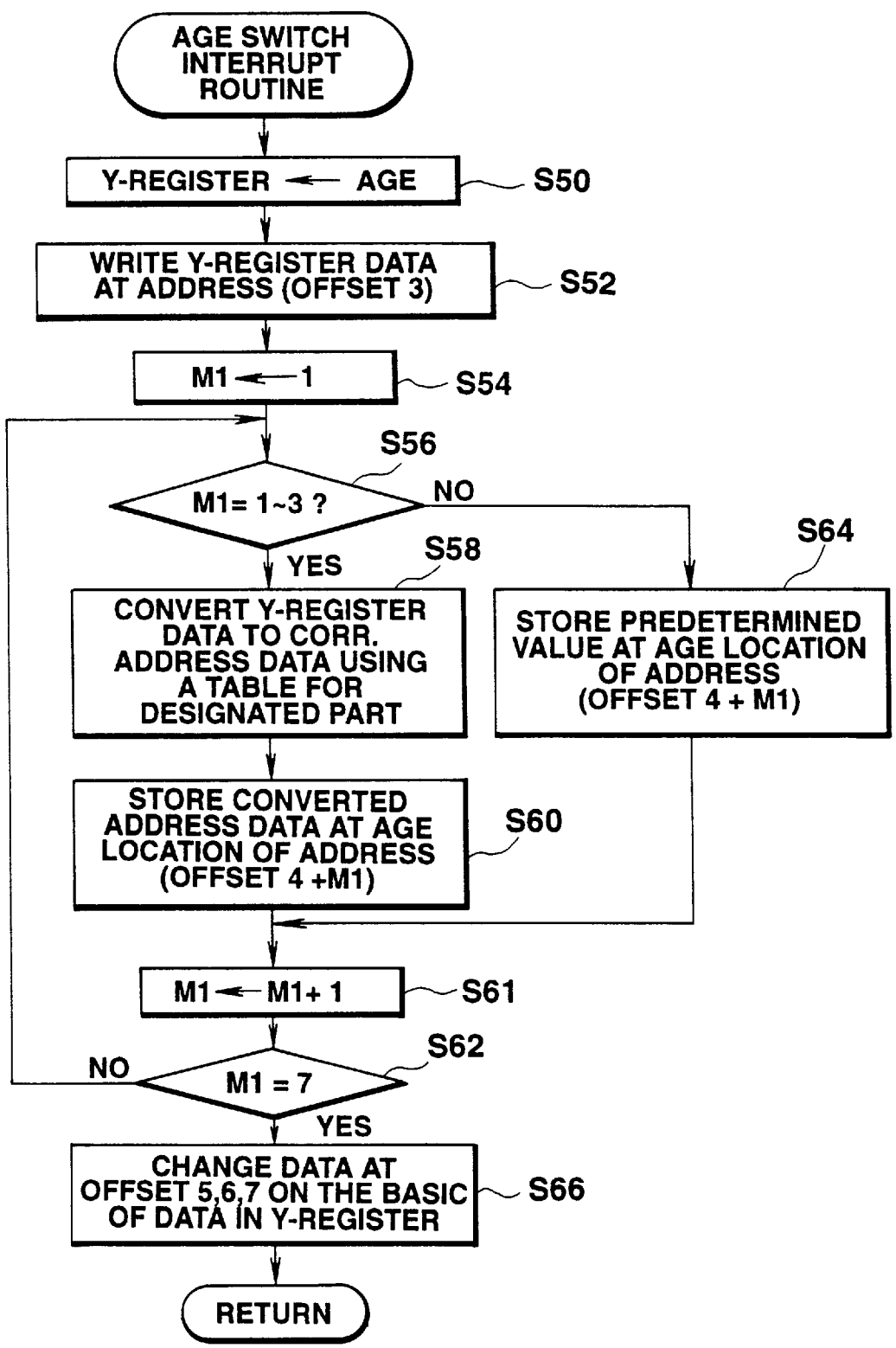
FIG. 10 is a flowchart indicative of an age switch interrupt routine.

FIG. 10 is a flowchart of the age switch interrupt routine. In this process, actual age data is stored in the Y-register 14 of CPU 1 in step S50. Then, the Y-register data is written at an age data location corresponding to the address (OFFSET3) in RAM 8, in step S52. At step S54 the value of the pointer M1 register 15 is set at "1". In this case, the value of the register 15 corresponds to the kind of each of the parts, for example, the pointer M1=1 corresponds to a hair style; M1=2 corresponds to a contour; M1=3 corresponds to eyes; . . .

Control then passes to step S56, where it is determined whether the current value of the register 15 is in a range of "1"–"3" or whether it indicates a routine to designate three different parts including a hair style, a contour, and eyes because in the present embodiment only face characteristic data on those three parts are required to be changed depending on age and face characteristic data on other parts are not required to be changed in accordance with an age.

When at step S56 it is determined to be YES or it is determined that the value of the register 15 is in a range of "1"–"3" or that it indicates a routine to designate a face characteristic data item on any of the hair style, contour and eyes, control passes to step S58, where age data (input actual-age data) in the y-register 14 is converted to address data (corresponding to age location d of FIG. 5B) used to designate one part pattern in a respective one of the age part pattern ROMs 7A–7N which compose the part pattern ROM 7, using a table provided for a part of a kind designated by the value of the register 15. For example, when data on ten years of age is stored in the y-register A, it is converted to address data used to designate a pattern of a part "hair style" in the age pattern ROM 7B for ten years of age.

At step S60 address data converted in accordance with the input age data is stored at an age location d corresponding to (OFFSET4+1) of FIG. 5A.

Similarly, if the values of the register 15 are "2", "3", they are for execution of a routine to designate face characteristic data items on the "contour", "eyes", respectively, of the face. Thus, age data items to designate part patterns of the "contour", "eyes" suitable for the age are stored at age locations d of corresponding addresses "OFFSET4 +2", "OFFSET4 +3".

At step S61 the value of the register 15 is incremented. As a result, at step S62 it is determined whether the value of the register 15 is "7" or whether selection of all the face characteristic data items on the six parts; the hair style, contour, eyes, . . . , has been completed. Unless M1="7", control returns to step S56, where the same looping operation is iterated.

When at step S56 it is determined that the value of the register 15 is not in the range of "1"–"3", or that the value of the register 15 is in a range of "4"–"6", it indicates a routine to designate face characteristic data on parts other than the hair, contour, and eyes or a routine to process face characteristic data on parts which are not required to be changed in correspondence to the input age data. Thus, control passes to step S64, where a predetermined value. is stored at an age location d of address ((OFFSET4+M1=4, 5 or 6)) of FIG. 5A. In the case of this embodiment, address data to designate a part pattern other than the hair style, contour and eyes, for example, of thirty years of age is stored as a predetermined value at the age location d.

The reason why the predetermined value is stored is to fix at a given state data items on face characteristics on parts other than the hair style, contour and eyes. For example, when the value of the register 15 is "4", which indicates a routine to designate face characteristic data items on eyebrows, address data to designate a part pattern (for example, an eyebrows "01" in the age part pattern ROM 7A for thirty years of age in FIG. 2) corresponding to a part pattern for "eyebrow" having a predetermined shape stored in the age part pattern ROM 7A for thirty years of age set initially beforehand is stored at an age location d, in spite of the input age data being large or small.

At step S61 the value of the register 15 is incremented to make the determination at step S62. In this way, the looping operation is iterated until M="7", at which time control passes to step S66 where address data stored at addresses (OFFSET5 and OFFSET 6) in the work RAM 8 are changed in accordance with the contents of the y-register 14. Stored at those addresses are address data to select desired "wrinkles"part patterns from among face's "wrinkles" part patterns stored in the corrected part pattern ROM 10 to be described later. Changing the address data in accordance with the contents of the y-register 14 is to change the respective address data items stored at OFFSET5–7 to addresses corresponding to age data stored in the y-register 12 to select a part pattern "wrinkles"suitable for an age. When the process at step S66 is completed, the present routine is terminated.

Figure 11:
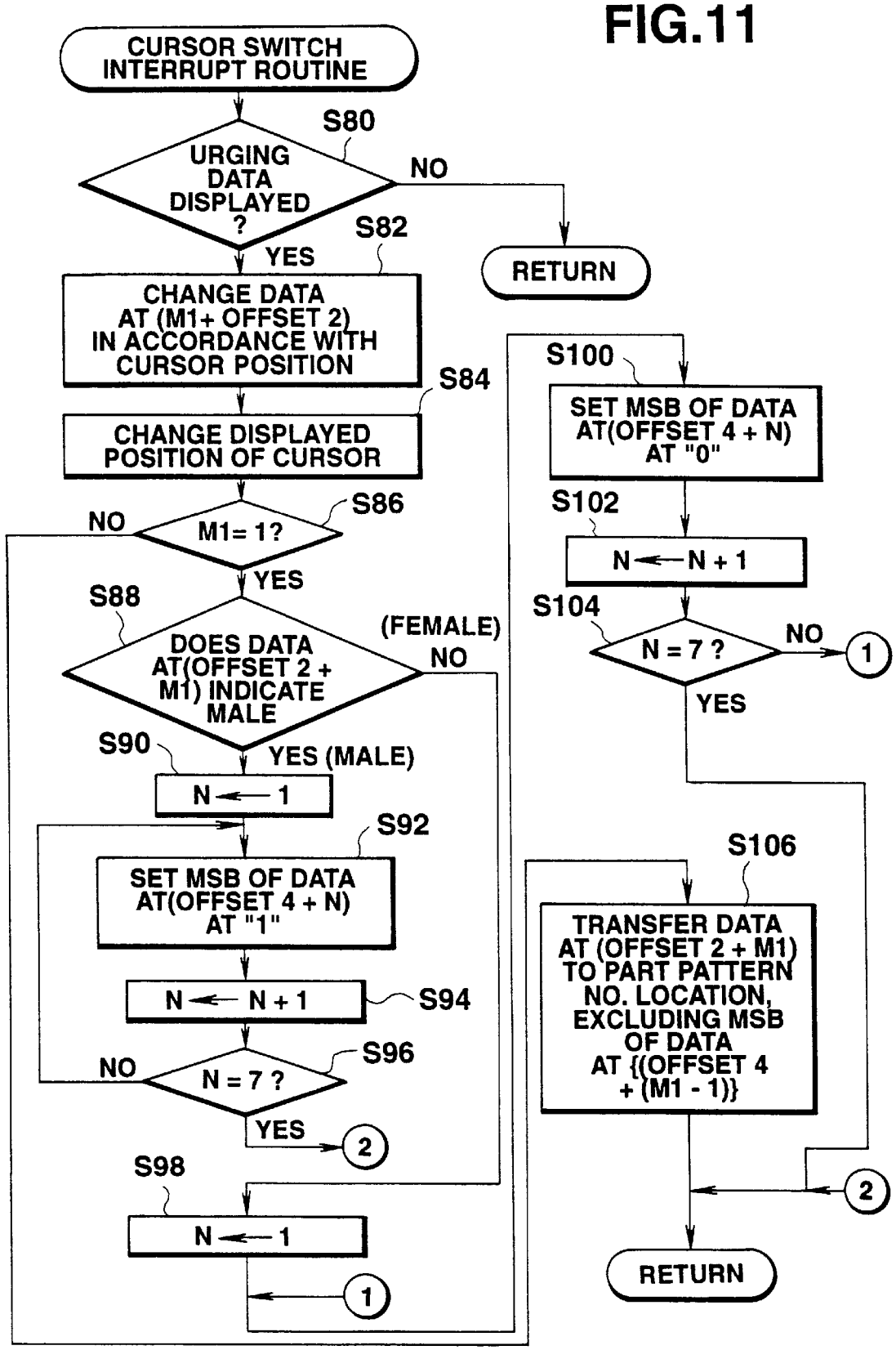
FIG. 11 is a flowchart indicative of a cursor switch interrupt routine.

FIG. 11 is a flowchart indicative of a cursor switch interrupt routine. The cursor switch 3 is operated to select sex data, face characteristic data, etc., when a desired face image is created by a combination of desired part patterns. When the cursor switch 3 is operated, control passes to the cursor switch interrupt routine. Then, at step S80 it is determined, for example, in accordance with the value of a display flag in the CPU 1 whether screen data which urges the user to select a sex or respective parts of FIGS. 9A–9D is now under display. This determination relates to whether some screen is displayed on the display 11. If a selected picture is not displayed at present, it is unnecessary to display the position of the cursor K. When it is determined that no selected screen data is displayed, the current routine returns.

If it is determined that the selected picture data is under display when the cursor switch 3 is operated, control passes to the next step S82, where data to select a sex and a part pattern number set at present at address (M1+OFFSET2) in the work RAM 8 is changed in accordance with the position of the cursor K of the cursor switch 3 operated this time.

For example, when it is determined that M=1, "sex" data stored at (OFFSET2+1) is changed in accordance with the position of the cursor K of the cursor switch 3 operated this time. Thus, if the position of the cursor K of the cursor switch 3 operated this time is changed from "02" to "01" in the state where "sex" selection screen of FIG. 9A is displayed, the sex data is changed to "01 (male)" in accordance with the position of the "01". If the position of the cursor K of the cursor switch 3 is changed from "01" to "102", sex data is changed to "02 (female)" in accordance with the position of the "02".

When it is determined that M=2, data (part pattern number) on the "hair style" stored at address (OFFSET2+2) is changed in accordance with the position of the cursor K of the cursor switch 3 operated this time. Thus, if the position of the cursor K of the cursor switch 3 operated this time is set at one of "01", "02", . . . when "hair style selection screen" of FIG. 9B is displayed, data on a part pattern number stored at address (OFFSET2+2) is changed in accordance with that position to a part pattern number corresponding to the appropriate one of a "thin-haired parted-at-7:3 hair style", "thick-haired parted-at-7:3 hair style", . . .

At step S84 the displayed position of the cursor K on the display 11 is changed in accordance with the change of the data mentioned above.

At step S86 it is determined whether the value of the register 15 is "1" or it is determined whether the screen data is for determination of a sex. As a result, when M="1" is determined, control passes to step S88, where it is determined whether data at address (OFFSET2+1) indicates a male.

If so, at step S90 the value of a pointer N is set at "1" in order to sequentially increment the value of the pointer from a location for a part "hair style"corresponding to address (OFFSET4+1) which stores address data indicative of face characteristic data to a location for another part.

At step S92 "1" indicative of a "male" is set at the position of the most significant bit (at a sex data location designated by a) of the face characteristic data (hair style) corresponding to an address (OFFSET4+1).

At step S94 the value of the pointer N is incremented to N=2. At step S96 it is then determined whether N=7 in order to set the MSB of the face characteristic data at "1" up to the MSB of the face characteristic data at the largest address (OFFSET4+6) in an area which stores address data indicative of the face characteristic data. Since N is not 7 now, control returns to step S92 to iterate a process similar to that mentioned above. Thus, Since N=2 now, the MSB of the data items at address (OFFSET4+2) is set sequentially at "1". Similarly, the MSBs of the respective data at addresses (OFFSET4+3), . . . (OFFESET4+6) are set at "1". When N=7 at step S96, the current cursor switch interrupt routine is terminated and control returns to the main program.

At step S88 when the determination is NO, or it is determined that the data at address (OFFSET2+M1) does not represent a male, but "02" which indicates a female, control passes to step S98, where the pointer N is set at "1".

At step S100 the MSB of the data at address (OFFSET4+N) is set at "0". Since N="1" this time, first, the MSB of the data at address (OFFSET4+1) is set at "0". Then at step S102 the pointer N is incremented.

Thereafter, similarly, the MSBs of the respective data items at addresses (OFFSET4+3) to (OFFSET4+6) are sequentially set at "0".

When N=7 at step S104, the current cursor switch interrupt routine is terminated and control returns to the main program.

When at step S86 it is determined that the value of the register 15 is not "1", control passes to step S106, where the data at address (OFFSET2+M1) is transferred to a part pattern number location c where data on the part pattern number of FIG. 5B is stored in an area indicated by address ((OFFSET4+(M−1)). Thus, data on a part pattern number corresponding to the data on the position of the cursor K designated by the cursor switch 3 is transferred to a part pattern number location c for the face characteristic data storage.

After step S106, the cursor switch interrupt routine is terminated and control returns to the main program.

FIG. 12 is a flowchart indicative of a display switch interrupt routine. When the display switch 4 is operated to display a face image or a selected screen on the display 11, the display switch interrupt routine starts.

In this case, first at step S150, the display flag is inverted, which occurs each time the display switch 4 is operated.

At step S152 it is determined whether the display flag is "1". If not, control passes to step S154, where M1 is set at "1" and screen data which uses as the starting address the data stored at address (OFFSET1+1) is transferred to the VRAM 9. Since data-at address (OFFSET1+1) in the work RAM 8 is ADD1, and screen data corresponding to the address ADD1 is for sex selection, the transferred image data is first displayed on the sex selection screen display 11 as shown in FIG. 9A on the basis of the sex selection screen data in correspondence to the address ADD1. The user operates the cursor switch 3 to designate one of "01: a male" and "02: a female" in accordance with the sex selection screen. After step S154, control returns to the main program.

When it is determined that the display flag is "1"at step S152, the result of the determination is YES and control passes to step S156, where the value of the pointer M1 register 15 is set at "1". The value of the register 15 corresponds to the kind of a part. For example, the pointer M1=1 corresponds to hair style; M1=2 corresponds to contour; M1=3 corresponds to eyes; . . . At step S158 it is determined whether the value of the register 15 is "3". M1="3" designates face characteristic data for "eyes". The reason why it is determined at step S158 whether the value of the register 15 is "3" is that the position of the part "eyes" alone is required to be moved up or down relative to the whole face in accordance with the magnitude of the value of the input age data. If the part "eyes" is combined with other part patterns without the position of the part "eyes" being moved up or down, a face image corresponding to a designated age cannot be necessarily created. First, since M1=1, it is determined that the M=1 indicates no routine to designate face characteristic data for the part "eyes". Thus, control passes to step S160, where the data in the part pattern ROM 7 designated by the address data stored at present at address (OFFSET4+1) or image data read, using as the starting address the face characteristic data for the part "hair style" of all the face characteristic data, is transferred to the VRAM 9. Therefore, a part pattern for a hair style corresponding to the face characteristic data for the part "hair style" is displayed on the display 11.

At step S162 the value of the pointer M1 register 15 is incremented. At step S164 it is determined whether the value of the register 15 is "7" or whether selection of all the face characteristic data for all the six parts "hair style", "contour", "eyes", . . . has been ended. Unless M1="7", control returns to step S158, where the same looping operation is iterated. When at step S158 M="3", control passes to step S166, where face characteristic data for the eyes is displayed. At step S166 age data at address OFFSET3 is transferred to the y-register in the CPU 1 and stored there, and age indicated by data in the y-register 14 is displayed on the display 11.

At step S168 screen data or data on the pattern of the part "eyes" is read, using as the starting address face characteristic data for the "eyes" stored at address (OFFSET4+3). At step S170 the position of the read pattern of the part "eyes" on the y-coordinate is changed to a position in accordance with the value of age data in the y-register 14 and data on the pattern of the part "eyes" whose position is changed is transferred to the VRAM 9. Therefore, data on the pattern of the part "eyes" which has that changed position is recorded in the VRAM 9.

As a result, a face image having the pattern of the part "eyes" in the face image suitable for the designated age is displayed on the display 11.

Figure 13A:
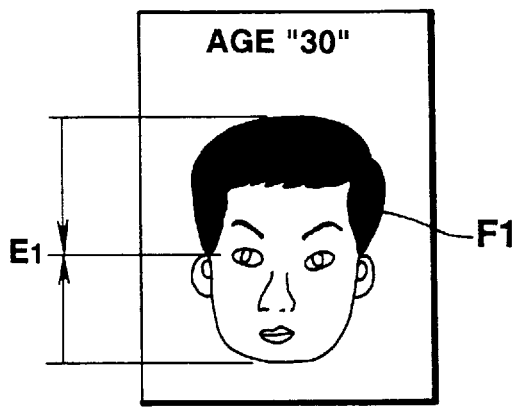
FIGS. 13A–13D each show one example of a face image created for an age.
Figure 13C:
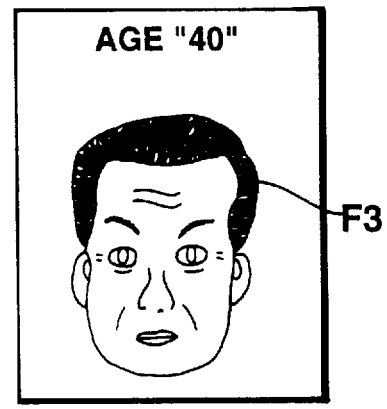

An age-dependent eye position table indicative of larger and smaller age values and corresponding upper and lower eye (y-coordinate) positions is stored beforehand in the CPU 1. Generally, as the age increases, the position of the eyes relative to the whole face tends to rise accordingly. For example, in the case of a face of ten years of age shown in FIG. 13B, the position E2 of eyes relative to the whole face is substantially at one third of the length of the face from its lower end. When the age is, for example, thirty, the position E1 of the eyes relative to the face of FIG. 13A is substantially at the midpoint of the length of the face. Values or data indicative of the positions of the eyes based on such tendency are stored on the age-dependent eyes position table.

According to this embodiment, a combined image with eyes whose position is corrected up or down relative to its whole face in accordance with the age is displayed.

After step S170, control passes to step S162, where the value of the register 15 is incremented to designate the next face characteristic data.

In this way, the above process is iterated in the range of "1"–"6" of the register 15 value. As a result, when M1="7" at step S164, control passes to step S172.

In the processes at step S172 and subsequent steps, a process for adding a pattern of a part "wrinkles"suitable for an age is executed . First, at step S172 it is determined whether the value of the y-register 14 is smaller than "35" or whether the designated age is less than 35 years. If so, it is regarded that no "wrinkles" are required to be formed at the "eye corners", and on the "forehead" and "cheeks" on the face under creation and the current routine is terminated. Thus, control returns to the main program (FIG. 13A).

When it is determined at step S172 that the value of the y-register 14 is not less than "35" and that the input age data is not less than 35 years, control passes to step S174, where data on a pattern of the part "crow's feet" which is screen data is read from the corrected part pattern ROM 10, using the starting address of the data stored at address OFFSET5. At step S176 the position of the read part pattern of the part "crow's feet" on the (vertical) y-coordinate is changed to another value in accordance with age data which is the contents of the y-register 14. Data on the part pattern for "crow's feet", the y-coordinate position of which has been changed, is transferred to the VRAM 9. Thus, a face image is created which has a pattern of a part "crow's feet" which has the number of wrinkles suitable for an age between 35 and 45 years of age and which has the changed position suitable for that age, and is displayed on the display 11.

Generally, as the age increases, the position of the eyes tends to move upward in proportion to that age in the face.

The position of possible crow's feet is required to be moved upward in correspondence to the movement of the eyes. In the present embodiment, as mentioned above, a process for that purpose is performed to thereby provide a face image having the position of eyes, the number of crow's feet, and the position of the crow's feet suitable for the designated age. The pattern of the part "crow's feet" is moved up or down in accordance with a designated age to a (y-coordinate) position where the pattern of the part "crow's feet" has the same height as the part "eyes", and data on the pattern of the part "crow's feet" is stored in the VRAM 9 and displayed on the display 11.

Control then passes to step S178, where it is determined whether the value of the y-register 14 is less than "45" or whether the designated age is between the thirty-five and forty-five years. In the case of this age bracket, processes for adding the "crow's feet"as well as "forehead wrinkles" are performed. When YES is determined at step S178, or it is determined that the designated age is less than 45, the current routine is terminated and control returns to the main program.

When it is determined that the input age is between forty-five and fifty-five years, control passes to step S180, where screen data (on the crow's feet and forehead wrinkles) read from the corrected part pattern ROM 10, using the data stored at addresses (OFFSET5), and (OFFSET6) as the starting addresses, are transferred to the VRAM 9. Thus, a face image having part patterns for the crow's feet and forehead wrinkles the respective numbers of which depend on an age between the forty-five and fifty-five years is displayed on the display 11. Generally, as the age increases, the crow's feet and forehead wrinkles tend to appear. According to this embodiment, a face image is created and displayed which has crow's feet and forehead wrinkles suitable for the age.

Control then passes to step S182, where it is determined whether the value of the y-register 14 is less than "55" or whether the age the data on which is input is between fifty-five and one hundred years. When YES is determined or the age data on which has been input is determined to be less than fifty-five years at step S182, the current routine is terminated and control returns to the main program. If the age is determined to be between fifty-five and one hundred years, control passes to step S184, where screen data (on the crow's feet, and forehead and cheek wrinkles) read from the corrected part pattern ROM 10, using as the starting addresses data stored at addresses (OFFSET5), (OFFSET6) and (OFFSET7) is transferred to the VRAM 9. Thus, a face image which has a part pattern for the "cheek wrinkles" the number of which depends on an age between fifty-five and one hundred years is displayed on the display 11. Generally, as the age increases, the crow's feet, and forehead and cheek wrinkles tend to appear. According to the present embodiment, a face image is created and displayed which has crow's feet, forehead and cheek wrinkles suitable for an age.

After step S182 the current routine is terminated and control return to the main program.

As described above, according to the present embodiment, when the cursor switch 3 is operated to designate face characteristic data, and the age data input switch 5 is operated to input age data, for example, on thirty years of age, a part pattern corresponding to the age data on the thirty years is selected for each of the parts of the face from among the part patterns in the part pattern ROM 7A, and a face image composed of a combination of the selected part patterns is created. As a result, as shown in FIG. 13A, a face image F1 suitable for the thirty years of age is displayed on the display 11.

Figure 13B:
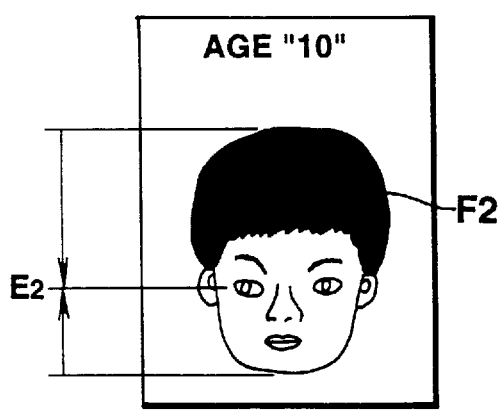

Thereafter, when the age data input switch 5 is operated to change the age data from data on thirty years of age, for example, to data on ten years of age, the pattern of the part "eyes" of the respective part patterns which compose the face image of thirty years of age is moved to a downward position depending on the age of ten years and data on the eye pattern at the downward position is stored in the VRAM 9. The respective part patterns of the hair style, contour, etc., under display at present are replaced with patterns of the part "hair style", "contour", . . . depending on the age data on ten years of age and data on the resulting pattern data is stored in the VRAM 9. Thus, a face image F2 suitable for the age data on ten years is created automatically and displayed on the display 11, as shown in FIG. 13B.

When the age data input switch 5 is operated to change the age data from age data on ten years to age data on forty years, the position of the pattern of the part "eyes" is changed to an upward position among the respective part pattern of the current face image for ten years of age and data on the resulting face image is stored in the VRAM 9. The respective part patterns including as hair style, contour, etc., under display at present are replaced with part patterns of a hair style, a contour, etc., depending on data on the changed age of "40" and data on the resulting face image is stored in the VRAM 9. In addition to the pattern of the crow's feet, a pattern of the part "forehead wrinkles suitable for the age of forty years is added and data on the resulting face image is stored in the VRAM 9. The eye corners are moved to the upward changed position of the pattern of the part "eyes". Thus, a face image suitable for data on the age of forty years is created automatically and is displayed as F3 on the display 11.

Figure 13D:
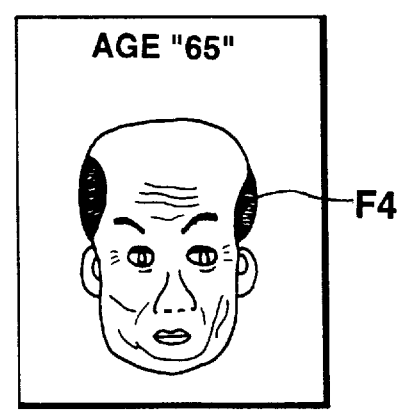

When the age data input switch 5 is operated to change the age data to data on an increased age of sixty-five years, for example, the respective part patterns of the face are changed to corresponding ones suitable for that age, and "crow's feet", and "forehead wrinkles" and "cheek wrinkles" are added. As a result, a face image F4 is automatically created and displayed which is suitable for a face of sixty-five years of age, as shown in FIG. 13D.

Therefore, according to the present embodiment, a face image suitable for the designated age is created rapidly and easily without requiring any special skills to create the face image.

According to the present embodiment, a face image suitable for a designated age is created on the basis of a face image having characteristics of the current user's or another person. Therefore, for example, a face image in the past or future can be easily created on the basis of that current face image. Thus, such face image can be predicted.

While in the present embodiment creation of a male face image has been illustrated, a female face image suitable for a designated age is created automatically in an operation similar to that mentioned in the formation of the male face image. A face image of an animal suitable for its age may be created in addition to the formation of a human face image suitable for his age. While in the present embodiment a face image suitable for his age is displayed on the display 11, the face image may be printed on a label tape or regular paper, for example, by a printer 13, as shown in FIG. 1.

As shown in FIG. 10, in the present embodiment, at step S50 actual age data, for example, of "10" indicative of ten years of age is input by the age data input switch 5 to and stored in the y-register 14 of the CPU 1. While at step S52 the age data in the y-register is written at an age data location corresponding to the address (OFFSET3) in the work RAM 8 and a face image suitable for that age data is created on the basis of the written data on the actual age, data on the date of a person's birth or past/future data on a person's age any years ago or hence may be input by the operation of the age input switch 5 in place of the actual age data.

More particularly, arrangement may be such that when a person's face image is created on the basis of the data on the date of his birth, or the data on his age in the past/future, his age at present or at any particular time in the past or future is calculated on the basis of data on the current date and time clocked by a clock 13A and the input data on the date of his birth or the past/future data, as shown in FIG. 1. At step S50 the calculated data on his age is stored in the y-register 14. At step S52 data on his age which is the contents of the y-register is written at an age data location corresponding to address (OFFSET3) in the work RAM 8, and a corresponding face image is created and displayed on the basis of the written data on his actual age.

Arrangement may be such that, for example, data on a face image created after the series of steps S10–S14 is stored in the VRAM 9; age data input and stored in the y-register 14 is updated sequentially with a lapse of the current time clocked by the clock 13A; and data on the face image stored in the VRAM 9 is changed sequentially on the basis of the updated age data to thereby create a face image corresponding to the current time.

According to the present embodiment, when data on an age is designated, data on patterns of the respective parts corresponding to that data is read and combined into a face image automatically. Therefore, a face image suitable for the designated age is created rapidly and easily without requiring any special skills.

According to the present embodiment, after a first face image suitable for a designated age is created on the basis of data on the designated age and input face characteristic data, a second face image related to the first face image and suitable for a different age is created automatically on the basis of data on a second designated age different from the first designated age. Thus, for example, a face imagined or predicted in the past or future related to the current face image is created easily and rapidly on the basis of the current face image.

Second Embodiment

FIG. 14 shows a whole circuit structure of the second embodiment. The same element of the first and second embodiments is designated by the same reference numeral and further detailed description thereof will be omitted.

In FIG. 14, an age presuming device of the second embodiment is provided with a CPU 1, a characteristic switch 2, a cursor switch 3, a display switch 4, an age data input switch 5, a program ROM 6, a part pattern ROM 7, a work RAM 8, a VRAM 9, a display 11, an image data ROM 12, a position correction switch 16, an age presumption switch 17, and a membership function ROM 22.

CPU 1 functions to control the whole device. In this embodiment, when the characteristic switch 2, cursor switch 3, display switch 4, age data input switch 5, position correction switch 16, and age presumption switch 17 are operated, CPU 1 reads data items on corresponding part patterns from the part pattern ROM 7, etc., in accordance with program data stored in the program ROM 6 in response to the operation of such switches and combines them to create a face image. CPU 1 performs fuzzy inference on the basis of the created face image in conformity to predetermined fuzzy rules and performs an age presumption process for presuming the age of that image on the basis of the result of the inference.

The part pattern ROM 7 stores a plurality-of part patterns or images of each of the parts of a face image like the part pattern ROM 7 of FIGS. 2 and 3.

As shown in FIG. 15, the work RAM 8 is used as a work area in the control of CPU 1 like the work RAM 8 of FIG. 5A.

Figure 16:
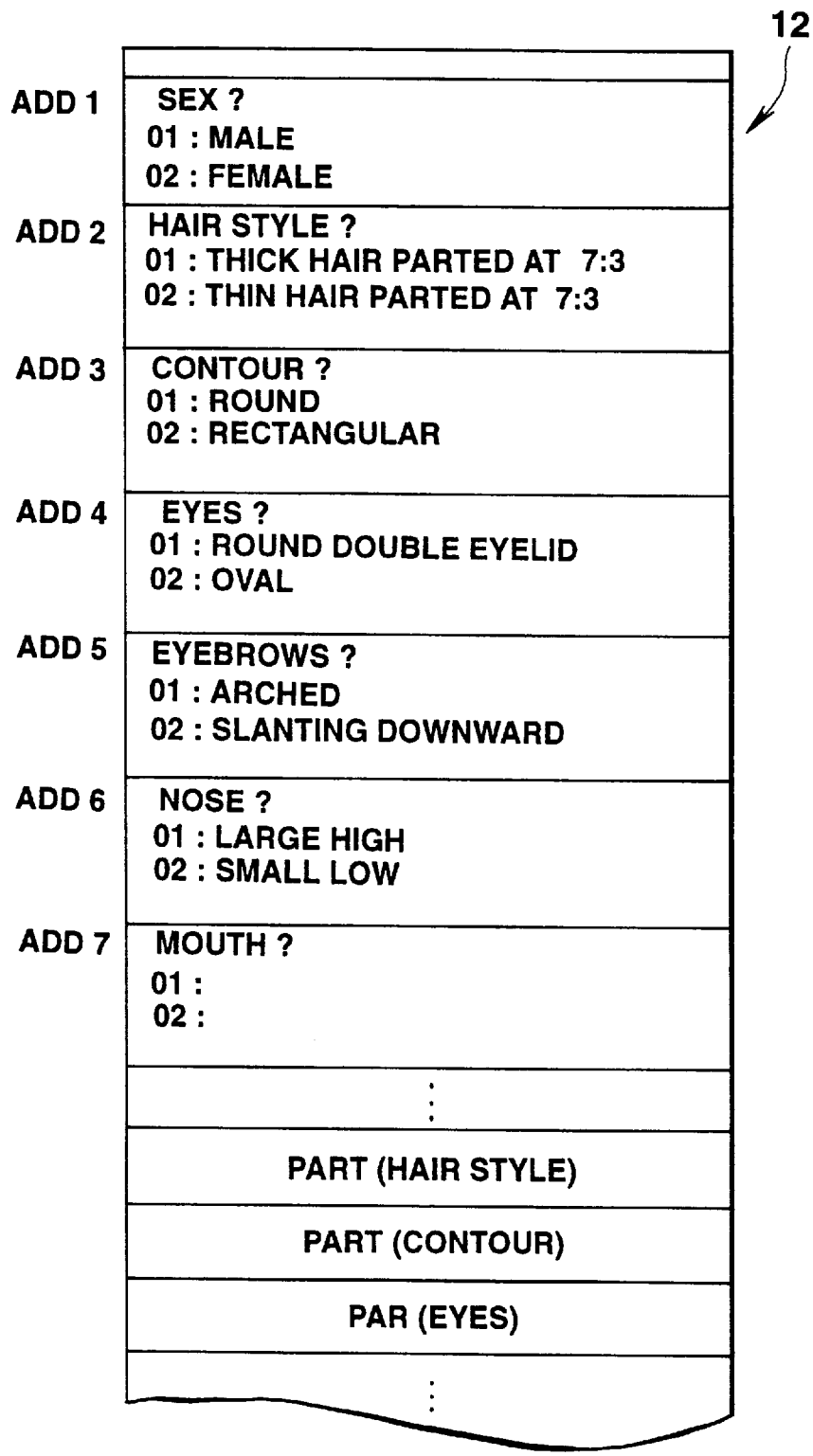
FIG. 16 shows an illustrative arrangement of data items stored in a screen data ROM in the second embodiment.

As shown in FIG. 16, the screen data ROM 12 beforehand stores various screen data items displayed on the display 11 when a face image is created, like the image data ROM 12 of FIG. 6.

The position correction switch 16 is operated to correct the respective positions of the part patterns of a desired face image to be created and is composed, for example, of an up and a down type switch.

The age presumption switch 17 is operated to presume the age of a created face image.

Figure 17A:
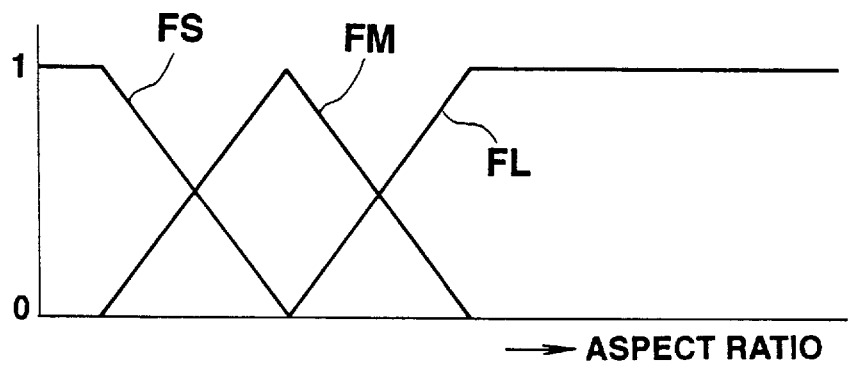
FIGS. 17A–17C each show a membership function ROM used for fuzzy inference in the second embodiment.
Figure 17B:
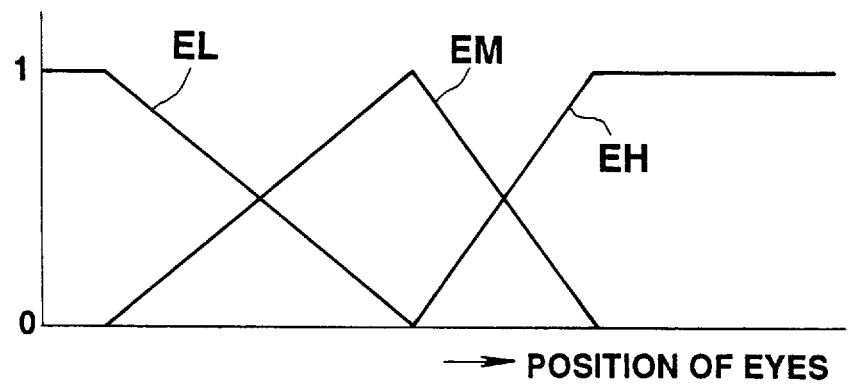
Figure 17C:
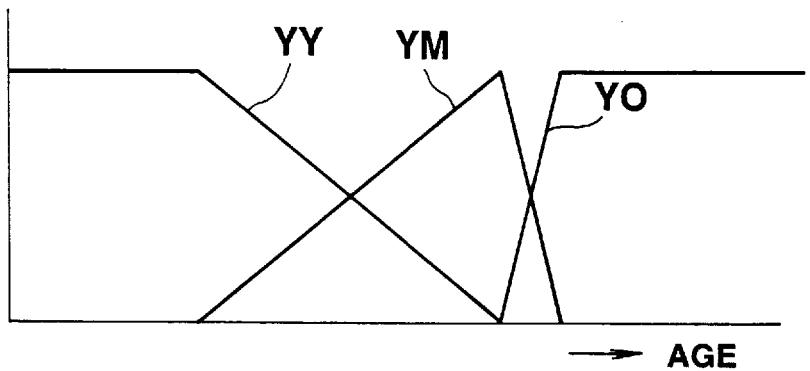

The membership function ROM 22 stores tables FS, FM, FL, EL, EM, EH, YY, YM, and YO related to corresponding membership functions of FIGS. 17A–17C. FIGS. 17A and 17B show the corresponding membership functions used in the protases of fuzzy rules A–C to be described later. That is, FIGS. 17A and 17B show the corresponding membership functions on the aspect ratio of a face and on the position of the eyes of the face. FIG. 17C shows a membership function related to an age which is a fuzzy output used in the apodoses of the fuzzy rules A–C.

The respective meanings of the tables related to the membership functions of the respective FIGURES are as follows:

FS:"The aspect ratio of a face is small";
FM:"The aspect ratio of a face is medium";
FL:"The aspect ratio of a face is large";
EL:"The position of eyes is low";
EM:"The position of eyes is medium";
EH:"The position of eyes is high";
YY:"The face is young-aged";
YM:"The face is middle-aged"
YO:"The face is old-aged"
"The face is middle-aged" is predetermined in accordance with a person's bracket as a target.

Fuzzy rules about an age presumption process for presuming the age of a face performed by the operation of the age presumption switch 17 will be described below.

While, generally, a fuzzy rule is expressed in a so-called "IF, THEN" format, the following three rules are adopted in the present embodiment:

Rule A: IF the aspect of a face=FL and the position of the eyes=EL, THEN the fuzzy output=YY (the face image is young-aged). The fuzzy rule A implies that "If the aspect ratio of a face is large and the position of its eyes is low, the face is young-aged".

Rule B: IF the aspect of a face=FM and the position of the eyes=EM, THEN the fuzzy output=YM (the face is middle-aged). The fuzzy rule B implies that "If the aspect ratio of a face is medium and the position of its eyes is medium", the face is medium-aged".

Rule C: IF the aspect of a face=FS and the position of the eyes=EH, THEN the fuzzy output=YO the face is old-aged). The fuzzy rule C implies that "If the aspect ratio of a face is small and the position of its eyes is high", the face is old-aged".

Figure 18:
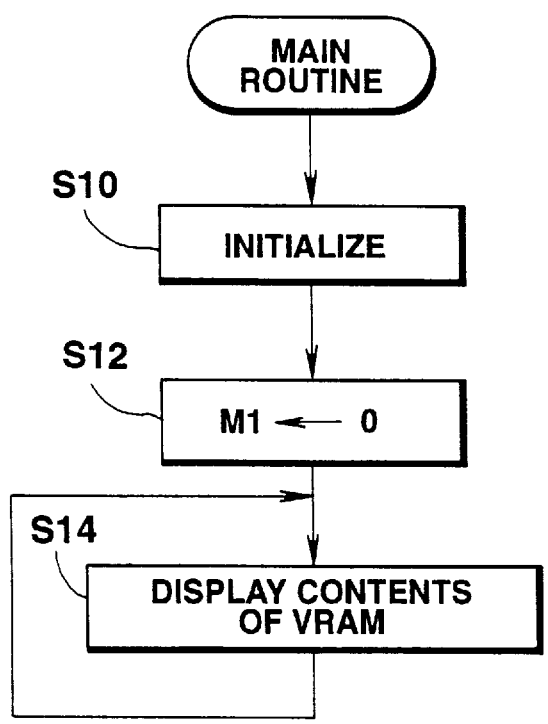
FIG. 18 is a flowchart indicative of a main program for a face image creation and age presumption process in the second embodiment.

The operation of the second embodiment will be described next. FIG. 18 is a flowchart indicative of a main program for a face image creation/age presumption process.

In order to create a desired face image, an initial setting operation similar to that of the main routine of FIG. 7 is first performed (see step S10 of FIG. 7). The pointer M is then cleared to "0" (see step S12 of FIG. 7). The contents of VRAM 9 are displayed on the display 11 (see step S14 of FIG. 7). Thus, for example, a face image under creation (see FIG. 27A) and a face image after creation (see FIG. 27B) as well as presumed age data presumed on the basis of the result of fuzzy inference in the second embodiment and actual age data keyed in by the user are displayed on the display 11 (see FIGS. 27D and 27E). Thereafter, control is on standby at step S14 of FIG. 7. Required process steps are then performed on the basis of interrupt signals from the respective switches: characteristic switch 2, cursor switch 3, display switch 4, age switch 5, position correction switch 16 and age presumption switch 17 (The last two of those switches are used additionally in the embodiment).

Since flowcharts indicative of a characteristic switch interrupt routine and a cursor switch interrupt routine in the second embodiment are the same as those flowcharts indicative of the corresponding routines (FIGS. 19 and 22) in the first embodiment, further description thereof will be omitted and flowcharts will be described below which are indicative of corresponding process routines which are a display switch interrupt routine, a position correction switch interrupt routine and an age presumption switch interrupt routine, which are different from the process routines employed in the first embodiment.

Figure 19:
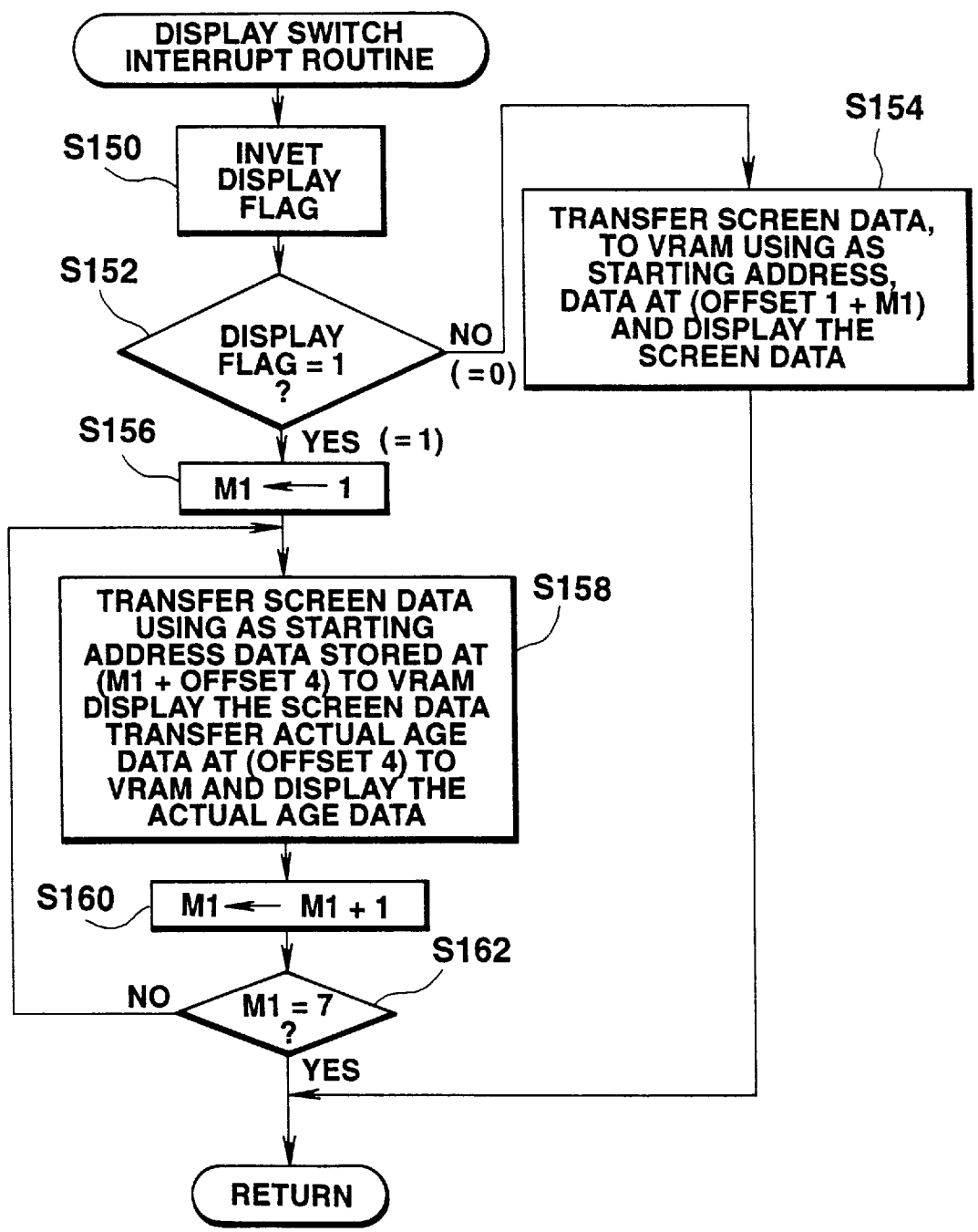
FIG. 19 is a flowchart indicative of a display switch interrupt routine in the second embodiment.

FIG. 19 is a flowchart indicative of the display switch interrupt routine. When the display switch 4 is first operated, control passes to the display switch interrupt routine, where at step S150 the display flag is inverted, which occurs each time the display switch 4 is operated.

At step S152 it is determined whether the display flag is "1". If not, control branches from step S152 to step S154, where screen data is transferred to VRAM 9, using as the starting address data stored at address (OFFSET1+M1). In this case, if M=1, the transferred data is sex kind selection display screen data corresponding to ADD1 which is data at address (1+OFFSET1) in the work RAM 8. Thus, a sex selection screen (see FIG. 9A) is displayed on the display 11. The user operates the cursor switch 3 in accordance with the screen to designate one of a male and a female. After step S154, control returns to the main program.

When the display switch 4 is again operated, the result of the determination at step S152 is YES and control passes to step S156, where the pointer M1 is returned to "1".

Figure 27A:
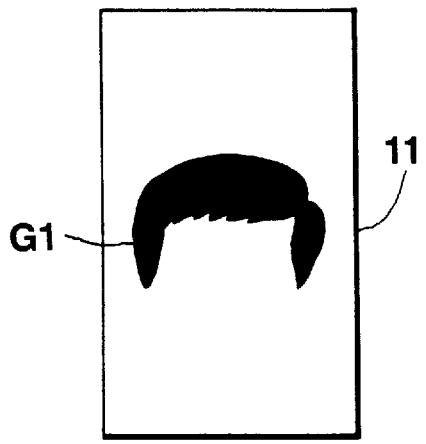
FIG. 27A shows an illustrative face image under creation.
Figure 27B:
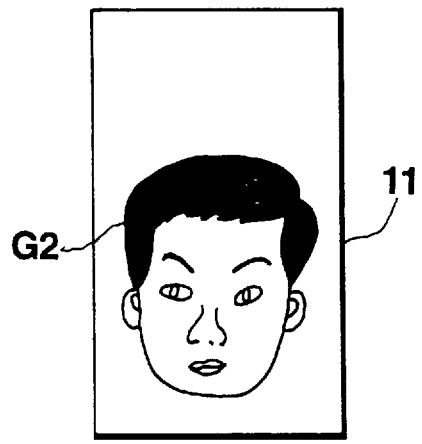
FIG. 27B shows an illustrative face image after creation.

The pointer M1 expresses the following. M1=1 expresses sex; M1=2 a hair style; M1=3 a contour; M1=4 eyes, . . . Thus, at step S158 screen data is transferred to VRAM 9 using as the starting address data stored at address (M1+OFFSET4) in the work RAM 8. In this case, the screen data, using as the starting address the data stored at address (OFFSET4+M1) is face characteristic data (on a sex, and pattern Nos. of parts "hair style", "contour", "eyes", . . . . Thus, each time M1 is incremented at step S160, the corresponding face characteristic data items (on a sex and patterns Nos. indicative of the respective parts "hair style", "icontour", "eyes", . . . ) are read sequentially. Thus, data items on part patterns corresponding to respective part pattern numbers indicative of the parts "hair style", "contour", "eyes". . . of the face characteristic data are read sequentially from the part pattern ROM 7 and transferred to VRAM 9. Thus, as shown in FIG. 27A, a face image G1 composed of a part pattern of a "hair style" is first displayed on the display 11. Part patterns of "contour", "eyes", "eyebrows", "nose", and "mouth" are combined sequentially with the first face image Gi which is composed of the part pattern of the "hair style". As a result, a face image G2 composed of a combination of all the part patterns is displayed on the display 11, as shown in FIG. 27B.

Figure 27C:
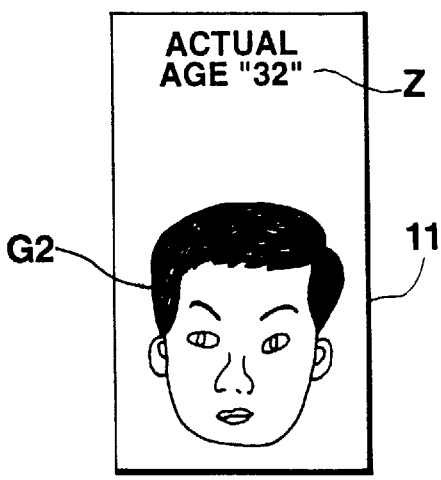
FIG. 27C shows an illustrative face after creation and actual age data.

At steps S50 and S52 of FIG. 10 when the user operates the age switch 5 before or after creation of the face image G2, actual age data (in this case, data "aged 30") is stored at address (OFFSET3) in the work RAM 8. If the actual age data has been stored during or after creation of the face image G2, it is read out and transferred to VRAM 9. Thus, the face image G2 and the actual age data z are displayed on the display 11, as shown in FIG. 27C.

At step S160 the value of the pointer M1 is incremented sequentially, during which it is determined at step S162 whether the pointer M1 is "7" or whether selection of face characteristic data about all the six parts "hair style" to "mouth" of the face has been completed. Unless M1="7", all the face characteristic data has not been read out. Thus, control returns to step S158, where a similar looping operation is iterated.

When the above process is iterated in a range of "1"–"6" of the pointer M1 until M1="7" at step S162, this routine is ended and control returns to the main program.

Figure 20:
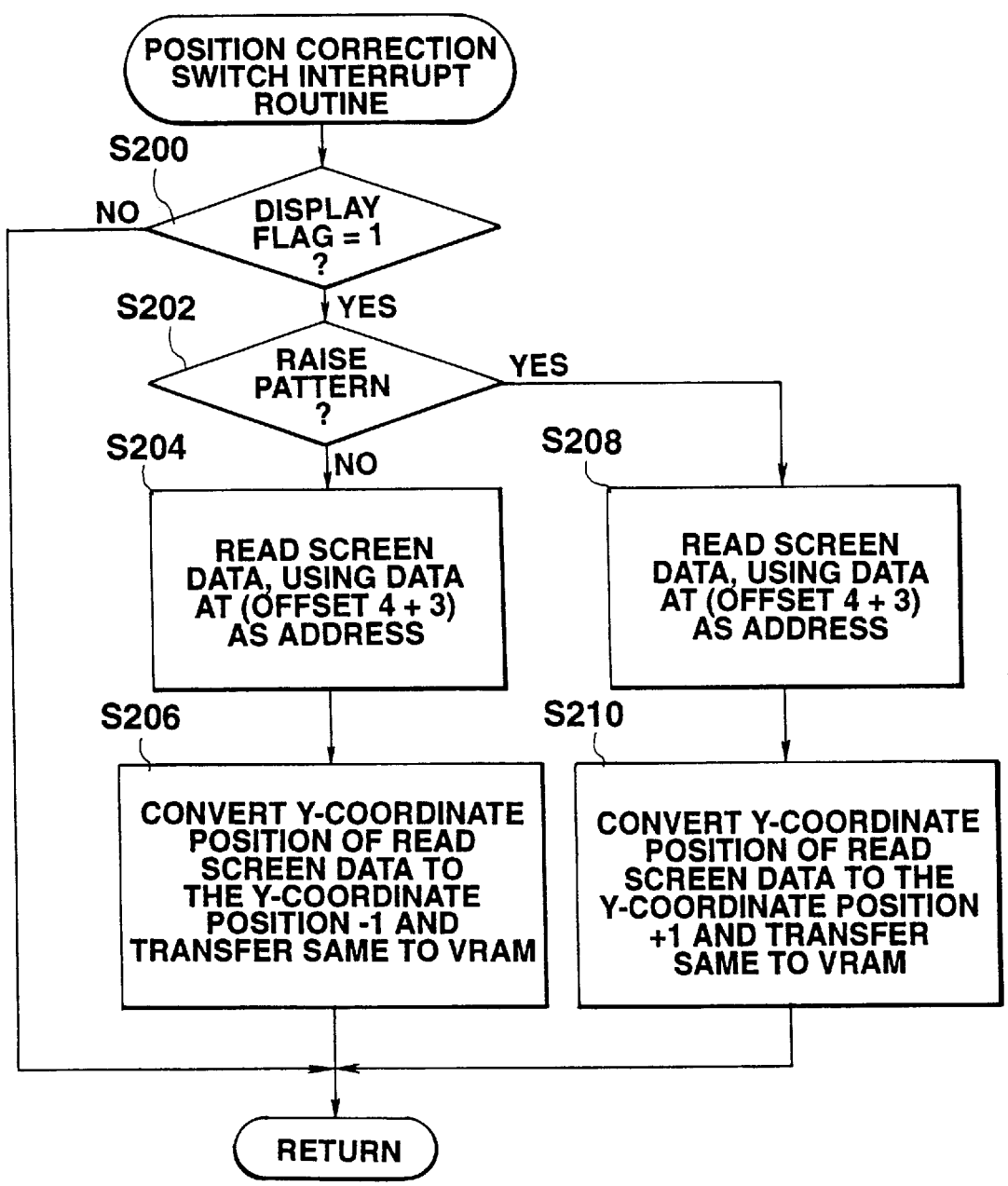
FIG. 20 is a flowchart indicative of a position correction switch interrupt routine in the second embodiment.

FIG. 20 is a flowchart indicative of a position correction switch interrupt routine for correction of the position of the eyes. When the position correction switch 16 is first operated, control passes-to the position correction switch interrupt routine. Thus, at step S200 it is determined whether the display flag is "1". As mentioned above, the display flag is inverted each time the display switch 4 is operated.

When at step S200 it is determined that the display flag is not "1", it is determined that no face image is displayed on the display 11. Thus, the current routine is terminated and control returns to the main program. When the display flag is determined to be "1", it is determined that the face image has been displayed. Thus, control passes to step S202, where it is determined whether the operation of the position correction switch 16 raises the position of a part pattern. Since in this embodiment the position correction switch 16 is composed of the up switch and the down switch, it is determined in this case whether the up switch has peen depressed. If not, it is determined that the down switch has been depressed and control then passes to step S204.

At step S204 the part pattern No. of "eyes" which is screen data is read, using as an address the data stored at address (OFFSET4+3). At step S206 the y-coordinate position of the pattern of the part "eyes" corresponding to the pattern No. of the part "eyes" as the read display screen data is converted to a new y-position including the value of the former y-coordinate position minus 1. Data on a pattern of the part "eyes" indicated by a part pattern No. corresponding to the value of the new y-coordinate position (a lower position on the y-coordinate position) is transferred to VRAM 9. As a result, a face image G2 including the pattern of the part "eyes" having the lower position is displayed on the display 11.

After step S206 the current routine is terminated and control returns to the main program.

When it is determined at step S202 that the up switch has been depressed, control passes to step S208, where a pattern No. of the part "eyes" which is screen data is read, using as an address the data stored at address (OFFSET4+3). At step S210 the value of the y-coordinate position of the pattern of the part "eyes"corresponding to the part pattern number for the "eyes" which is the read screen data is converted to the value of the y-coordinate position plus 1. Data on a part pattern of the part "eyes" indicated by the pattern number corresponding to the converted value of the y-coordinate position (an upper position on the y-coordinate axis) is transferred to the VRAM 9. As a result, a face image G2 which includes the pattern of the "eyes" whose position is changed to the upper position on the y-coordinate axis is displayed on the display 11.

Exiting step S210, control terminates the current routine and returns to the main program.

Figure 21:
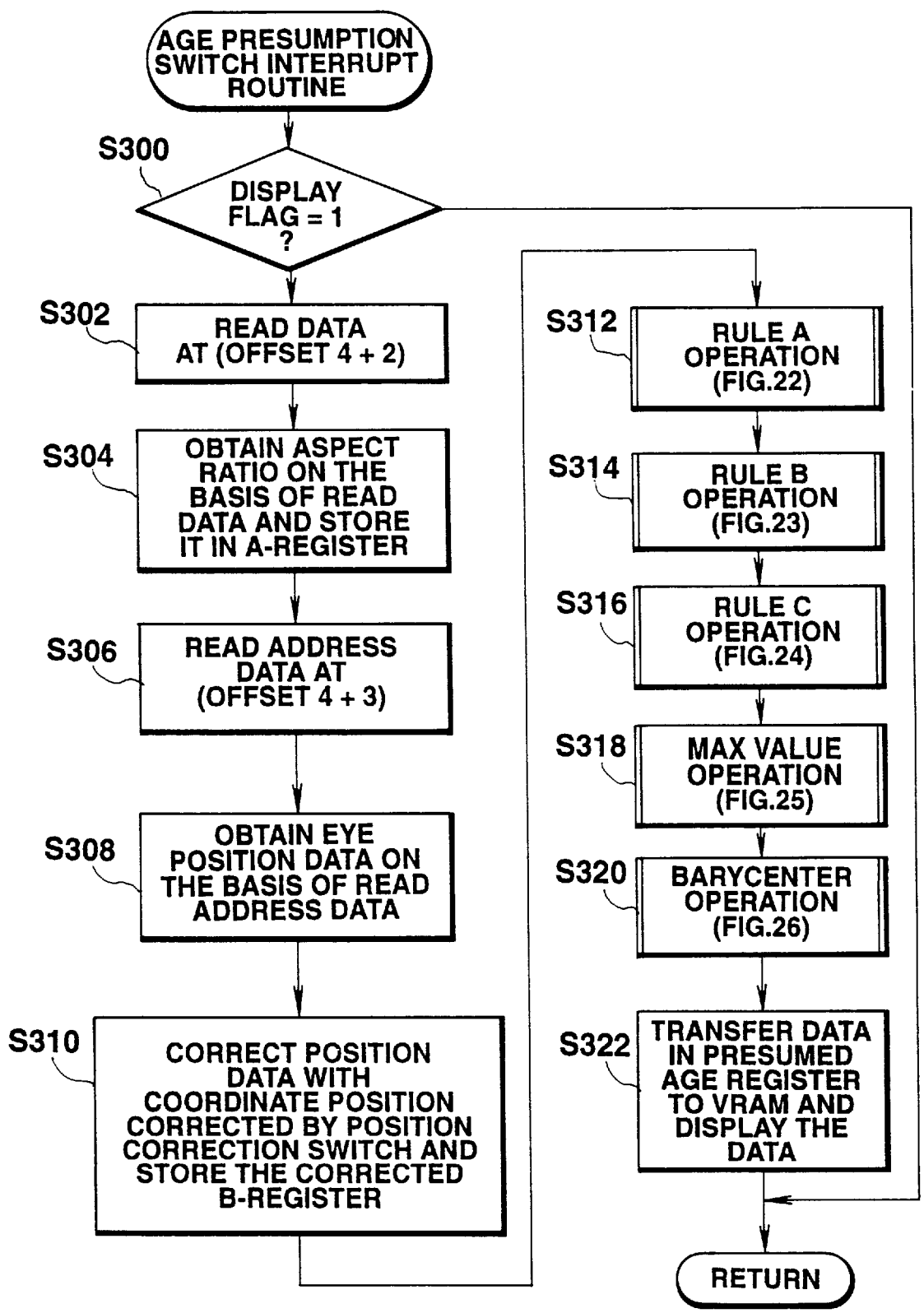
FIG. 21 is a flowchart indicative of an age presumption switch interrupt routine in the second embodiment.

FIG. 21 is a flowchart indicative of an age presumption switch interrupt routine. When the age presumption switch 17 is first depressed, control passes to that routine. First, at step S300 it is determined whether the display flag is "1". If not, it is determined that no face image is displayed, and control terminates the current routine and returns to the main program.

When the display flag is "1", it is determined that the face image has been displayed and step S302 and subsequent steps are executed. First, at step S302 face characteristic data is read which relates to the contour of the face, data on which is stored at address (OFFSET4+2). At step S304 the aspect ratio of the face of the image created by the manual operation of the user is calculated on the basis of the read face characteristic data about the face contour. Since aspect ratio data items corresponding to the respective part patterns of the contour are stored beforehand, the aspect ratio of the face is calculated by reading the stored aspect ratio data on the basis of the read characteristic data about the face contour. The calculated value of the aspect ratio is stored in an A-register 23 in CPU 1. Data on the aspect ratio stored in the A-register 23 becomes a first one of two input parameters in the fuzzy inference.

While in the particular embodiment the-aspect ratio of the face of a created face image is obtained by reading data on the aspect ratios beforehand stored and corresponding to the respective part patterns of the contour, it may be calculated instead by actually measuring on the face image the longitudinal length of the created face image (in the direction of extension of a line connecting the top of the head and the point of the jaw) and its transverse width (in the direction of extension of a line traversing the face).

In order to presume the age of the face by fuzzy inference on the basis of the position of the eyes of the face image under creation, coordinate data indicative of the eye position designated by address data stored at address (OFFSET4+3) is read out at step S306. At step S308 data on the position of the "eyes"in the created face image is obtained on the basis of the read coordinate data indicative of the position of the "eyes". The manner of obtaining data on the position of the "eyes" in the created face image may be performed by measuring the position of the "eyes" actually on the appropriate face image unlike in the present embodiment.

At step S310 the y-coordinate position value corrected by the operation of the position correction switch 16 is stored in a B-register 24 in CPU 1. More particularly, the position of the "eyes" in the face image under current creation is basically calculated with data on the position of the. "eyes" in the face image corresponding to address data on the position of the "eyes" stored at address (OFFSET4+3). If the position of the "eyes" in the face image has been corrected by the operation of the position correction switch 16, the position of the "eyes" in the current face image is finally calculated in consideration of the corrected value of the position of the "eyes". Unless the position correction switch 16 has been operated, the corrected value is "0" and not corrected.

The value of the position of the "eyes" thus obtained is stored in the B-register 24 of CPU 1. The value of the position of the "eyes" stored in the B-register 24 is a second one of the two input parameters Thus, the aspect ratio of a face and the position of its "eyes" which are the two input parameters in the fuzzy inference are calculated.

A process for fuzzy inference at steps S312–S320 will be performed below on the basis of the aspect ratio of the face and the position of its "eyes", thus obtained.

First, at step S312 an operation for the above-mentioned fuzzy rule A is performed on the basis of the obtained aspect ratio of the face and the obtained position of its "eyes". Similarly, at steps S314, 316 corresponding operations for the above-mentioned fuzzy rules B and C are performed on the basis of the obtained aspect ratio of the face and the obtained position of its "eyes". The detailed contents of the processes for the fuzzy rules A, B and C will be described in subroutines to be described later. Thus, the process for the protasis of the fuzzy rules in the fuzzy inference is performed and the degrees of adaptability of the input values to the respective membership functions are calculated.

At step S318 the maximum value of data obtained in the rule operations (hereinafter referred to as a maximum value operation or an ORing process) is taken. At step S320 the barycenter of the data is calculated for defuzzification. Thus, a process for the apodosis of the fuzzy rule in the fuzzy inference is performed to provide presumed age data j of the created face image. The detailed contents of the maximum value operation and the barycenter operation will be explained in subroutines to be described later.

Figure 27D:
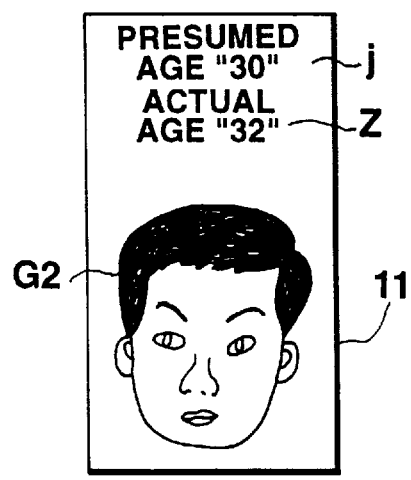
FIGS. 27D and 27E show an illustrative face after creation, actual age data and presumed age data.
Figure 27E:
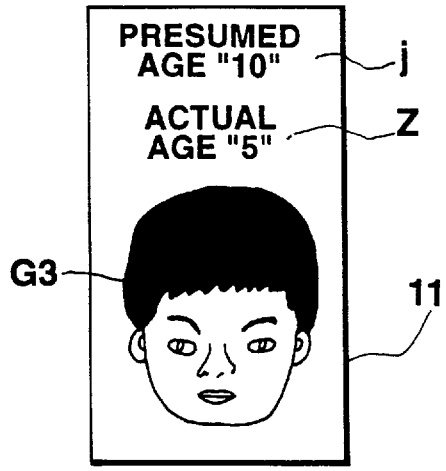

At S322 the obtained presumed age data j is transferred to the VRAM 9 and displayed on the display 11 (see FIGS. 27D and 27E). This causes the presumed age data j of the face image G2 created by the user to be displayed rapidly and easily. Thus, the presumed age data j of the face image G2 created by the user and the actual age data z of the face image G2 input by the user can be displayed in a contrastive state.

Figure 22:
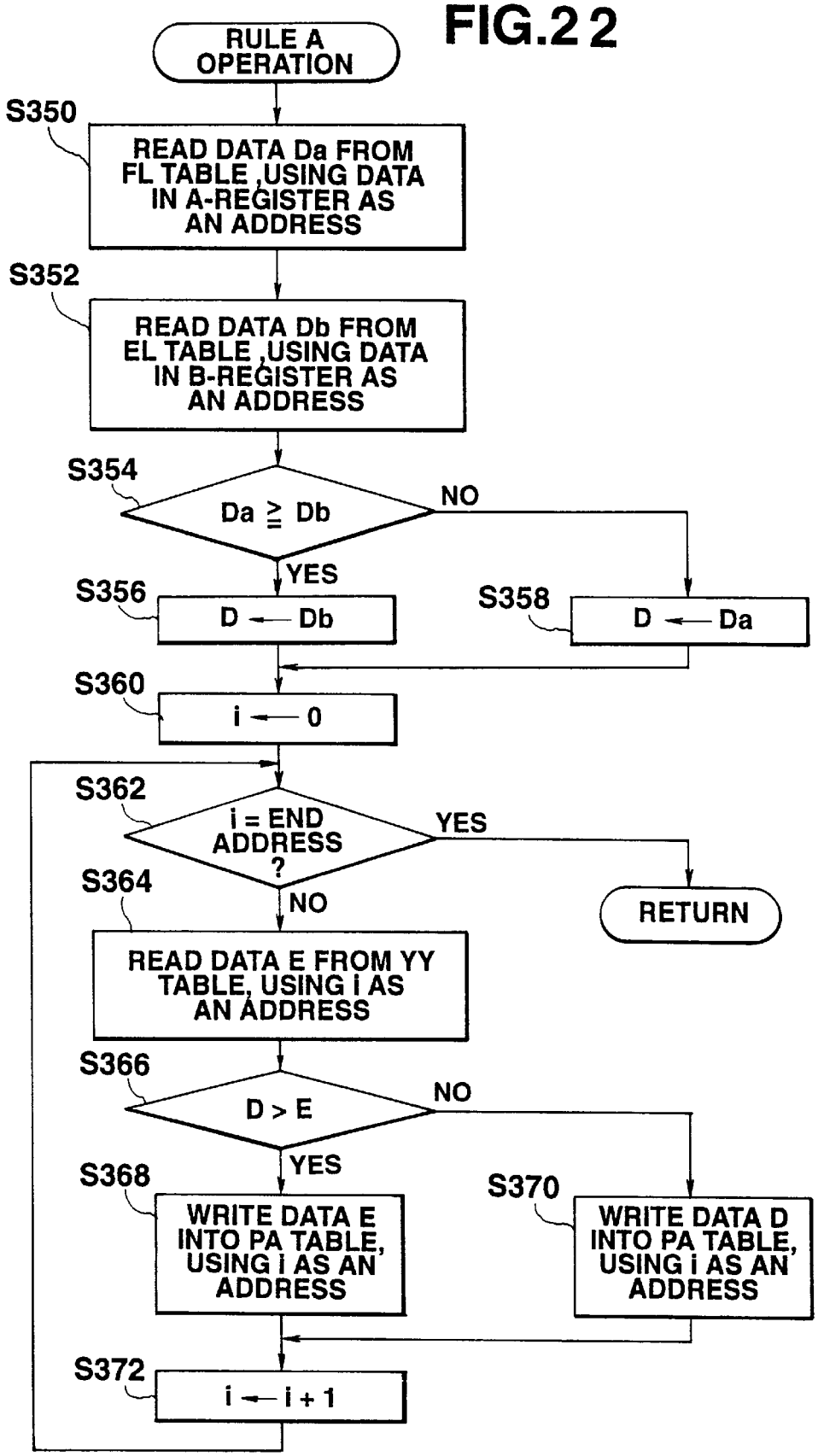
FIG. 22 is a flowchart indicative of a subroutine of a fuzzy rule A operation in the second embodiment.

FIG. 22 is a flowchart indicative of a subroutine of a fuzzy rule A operation process. First, at step S350 data (on the protosis of the rule A) Da is read from the FL table of the membership function ROM 22 in which data on the membership function "the aspect ratio is large" is stored, using as an address the data (on the aspect ratio of the face) in the A-register 23. The data Da in this case corresponds to the degree of adaptability of the membership function FL of FIG. 17A and has a value in a range of 0–1.

The data Da is the degree of adaptability of the rule A to an input value indicative of the aspect ratio of the face. The data Da is stored, for example, in another Da-register (not shown) in the CPU 1. This applies also to data Sb to be described later.

Similarly, at step S352 data (on the protasis) Db is read from the EL table of the membership function ROM 22 in which data on the membership function "the position of the "eyes" is low" is stored, using as an address the data (on the position of the "eyes") in the B-register 24. The data Db in this case corresponds to the degree of adaptability of the membership function EL of FIG. 17B and has a value in a range of 0–1. That is, the data Db is the degree of adaptability of the rule A to the input value indicative of the position of the "eyes".

At step S354 it is determined whether data Da is equal to or larger than data Db. If so, control passes to step S356, where the smaller one of Da and Db is employed as data D. In this case, D=Db.

This process includes an ANDing operation performed on the respective data items and corresponds to so-called obtaining the minimum value of the data items to thereby obtain a state in which both the input values are satisfied. Thus, the smaller one of data items Da and Db is employed as the determination which the rule A indicates in the current routine. When it is determined that Da<Db, control passes to step S358, where D=Da is employed.

As described above, the two input values (of the aspect ratio and "eyes" position of a face) are evaluated for the rule A at the time of the determination to thereby obtain the degree of adaptability of the protasis of the rule A.

At step S360 the address pointer i is reset at "0". At step S362 it is determined whether the value of the address pointer i is equal to the end address. If not, at the next step S364 data (on the apodosis) E is read from the YY table of the membership function ROM 22 in which data on the membership function "the face is young-aged" is stored, using i as an address. The data E in this case corresponds to the degree of adaptability of the membership function YY of FIG. 17C to the input values and has a range of 0–1. The data E is stored, for example, in another E-register (not shown) in CPU 1.

At step S366 data D and data E are compared. If it is determined that D>E, control passes to step S368, where data E is written into the PA table in the work RAM 8, using i as an address. If it is determined that D<E, control passes to step S370, where data D is written into the PA table in the work RAM 8, using i as an address. As just described above, a process is performed in which the smaller value is employed to cut the membership function YY.

This process is a so-called head cutting process in which the membership function YY as the latter condition section is cut in accordance with the degree of adaptability of the protasis.

At step S372 the address pointer i is incremented by "1" and control then returns to step S362, where a similar process is iterated until the address pointer i is equal in value to the end address, at which time control returns to an age presumption switch interrupt routine of FIG. 21. By incrementing the value of the address pointer i to the end address, all the membership functions YY are searched.

Thus, the "head cutting process" depending on the degree of adaptability of the protasis is performed on the membership functions.

In this way, the operation of the fuzzy rule A is performed on the basis of the aspect ratio and eye position (input values) of the created face image to calculate the degree of adaptability of the input values to the rule "if the aspect ratio of the face is large and the position of the eyes in the face is low, the face is young-aged". The fuzzy inference value "the face is young-aged" is obtained as the magnitude of the head-cut membership function YY.

Figure 23:
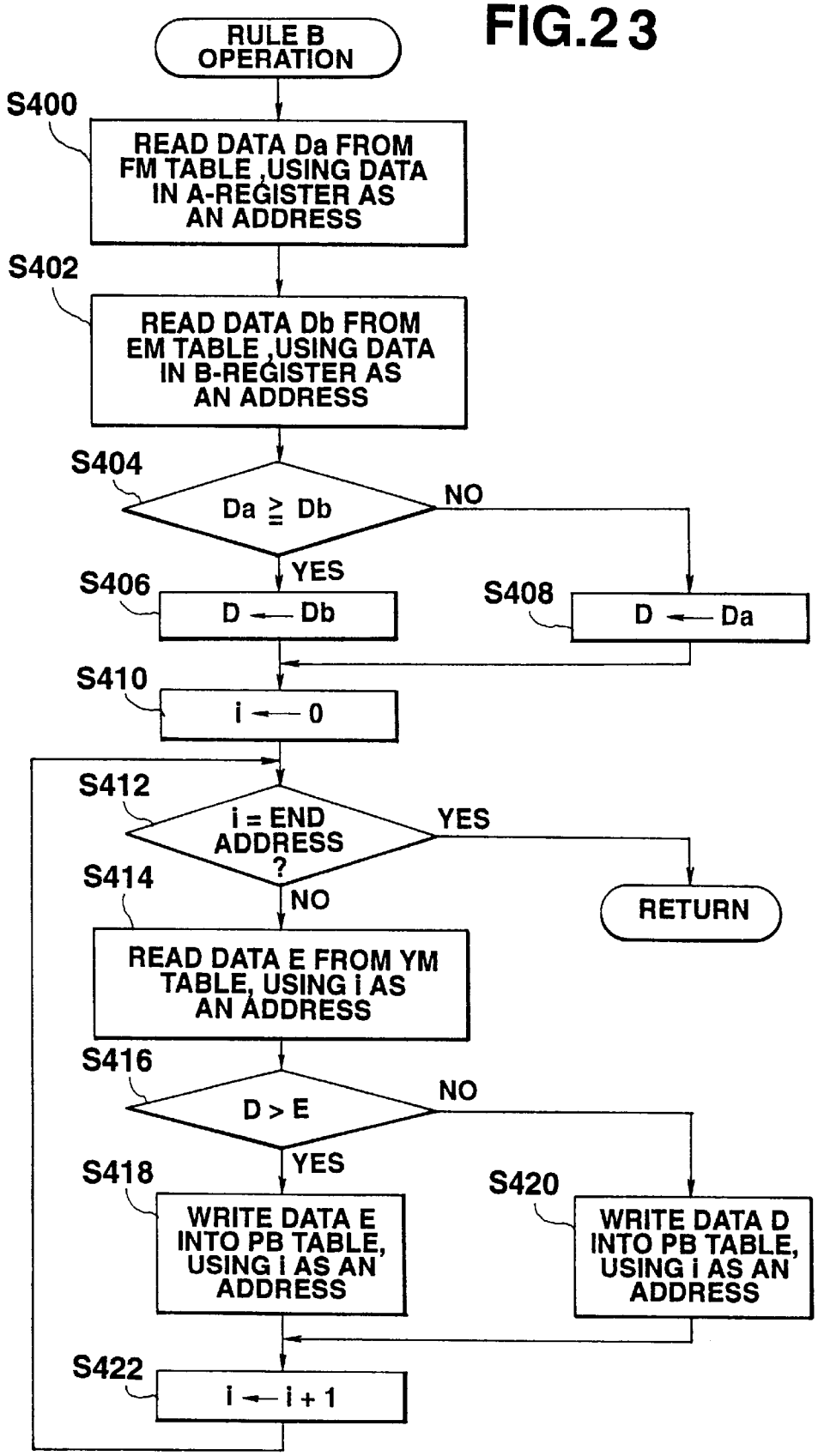
FIG. 23 is a flowchart indicative of a subroutine of a fuzzy rule B operation in the second embodiment.

FIG. 23 is a flowchart indicative of a subroutine of a fuzzy rule B operating process. First, at step S400 data (on the protasis) Da is read from the FM table of the membership function ROM 22 in which data on the membership function "the aspect ratio is medium" is stored, using as an address the data (on the aspect ratio of the face) in the A-register 23. The data Da in this case corresponds to the degree of adaptability of the membership function FM of FIG. 17A and has a value in a range of 0–1.

The data Da is the degree of adaptability of the rule B to the input value indicative of the aspect ratio of the face. The data Da is stored, for example, in another Da-register (not shown) in the CPU 1. This applies also to data Db to be described later.

Similarly, at step S402 data (on the protasis) Db is read from the EM table of the membership function ROM 22 in which data on the membership function "the position of the "eyes" is medium" is stored, using as an address the data (on the position of the "eyes") in the B-register 24. The data Db in this case corresponds to the degree of adaptability of the membership function EM of FIG. 17B and has a value in a range of 0–1. The data Db is the degree of adaptability of the rule A to the input value indicative of the position of the "eyes".

At step S404 it is determined whether data Da is equal to or larger than data Db. If so, control passes to step S406, where the smaller one of Da and Db is employed as data D. In this case, D=Db.

This process includes an ANDing operation performed on the data items and corresponds to so-called obtaining the minimum value of the data items to thereby obtain a state in which both the input values are satisfied. Thus, the smaller one of data items Da and Db is employed as the determination which the rule B indicates in the current routine. When it is determined that Da<Db, control passes to step S408, where D=Da is employed.

As described above, the two input values (of the aspect ratio of and the "eyes" position in the face) are evaluated for the rule B to thereby obtain the degree of adaptability of the protasis of the rule B.

At step S410 the address pointer i is reset at "0". At step S412 it is determined whether the address pointer i is equal in value to the end address. If not, at the next step S414 data (on the apodosis) E is read from the YM table of the membership function ROM 22 in which data on the membership function "the face is middle-aged" is stored, using i as an address. The data E in this case corresponds to the degree of adaptability of the membership function YM of FIG. 17C and has a range of 0–1. The data E is stored, for example, in another E-register (not shown) in CPU 1.

At step S416 data D and data E are compared. If it is determined that D>E, control passes to step S418, where data E is written into the PB table in the work RAM 8, using i as an address. If it is determined that D≦E, control passes to step S420, where data D is written into the PB table in the work RAM 8, using i as an address. As just described above, the process is performed in which the smaller value is employed to cut the membership function YM.

This process is a so-called head cutting process in which the membership function YM as the apodosis is cut in accordance with the degree of adaptability of the protasis.

At step S422 the address pointer i is incremented by "1" and control then returns to step S412, where a similar process is iterated until the address pointer i is equal in value to the end address, at which time control returns to the age presumption switch interrupt routine of FIG. 21. By incrementing the address value of the address pointer i to the end address, the whole membership function YM is searched.

Thus, the "head cutting process" depending on the grade of the former condition section is performed on the membership functions YM.

In this way, the operation of the fuzzy rule B "if the aspect ratio of the face is medium and the position of its eyes is medium, the face is middle-aged" is performed on the basis of the aspect ratio and eye position of the created face image to thereby calculate the degree of the fuzzy rule B to the input values. The fuzzy inference value "the face is middle-aged" is obtained as the magnitude of the head-cut membership function YM.

Figure 24:
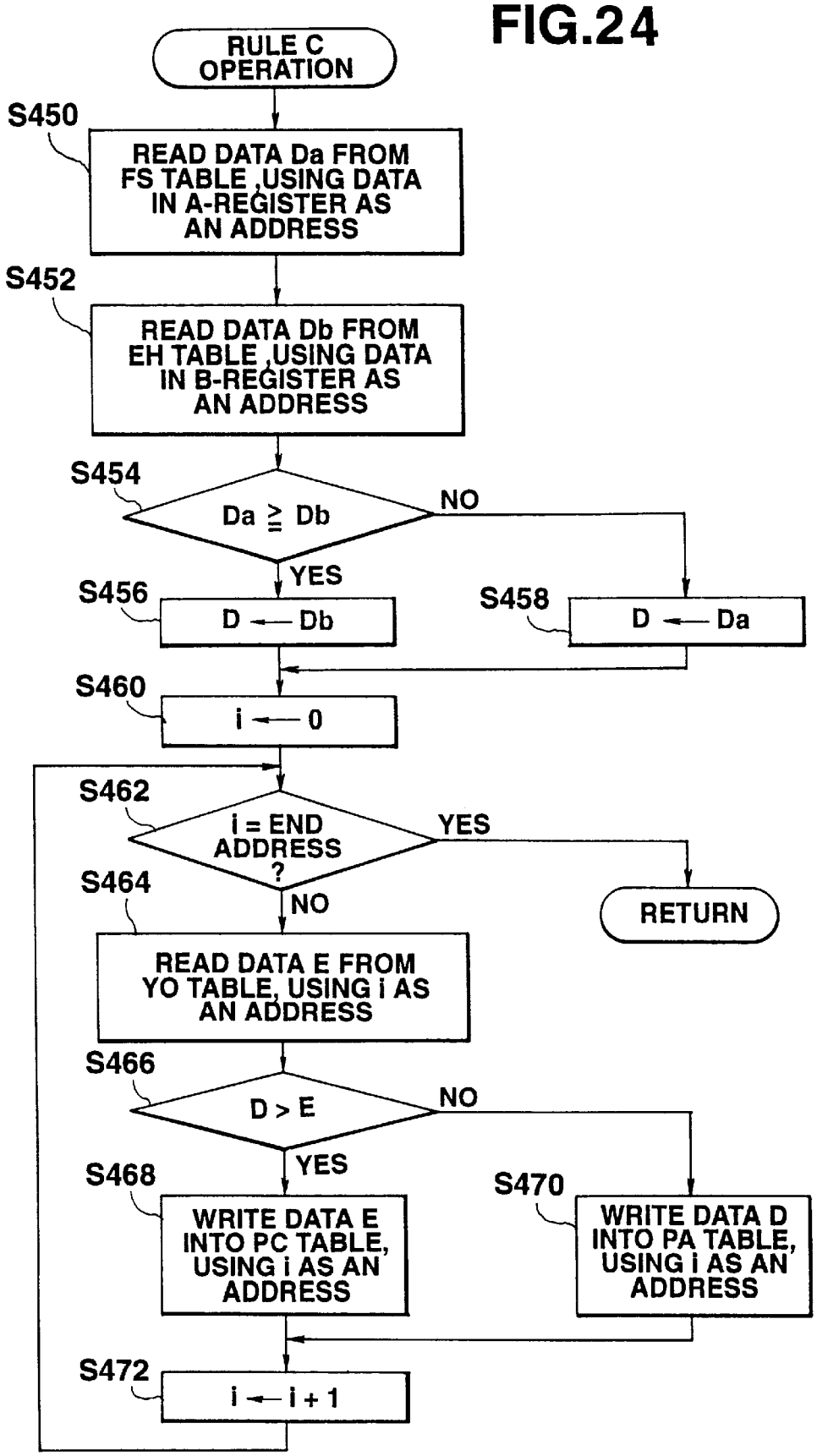
FIG. 24 is a flowchart indicative of a subroutine of a fuzzy rule C operation in the second embodiment.

FIG. 24 is a flowchart indicative of a subroutine of a fuzzy rule C operating process. First, at step S450 data (on the protasis) Da is read from the FS table of the membership function ROM 22 in which data on the membership function "the aspect ratio is smaller" is stored, using as an address the data (on aspect ratio of the face) in the A-register 23. The data Da in this case corresponds to the degree of adaptability of the membership function FS of FIG. 17A and has a value in a range of 0–1.

The data Da is the degree of adaptability of the rule C to the input value indicative of the aspect ratio of the face. The data Da is stored, for example, in another Da-register (not shown) in the CPU 1. This applies also to data Db to be described later.

Similarly, at step S452 data (on the protasis) Db is read from the EH table of the membership function ROM 22 in which data on the membership function "the position of the "eyes" is high" is stored, using as an address the data (on the position of the "eyes") in the B-register 24. The data Db in this case corresponds to the degree of adaptability of the membership function EH of FIG. 17B and has a value in a range of 0–1. The data Db is the degree of adaptability of the rule C to the input value indicative of the position of the "eyes".

At step S454 it is determined whether data Da is equal to or larger than data Db. If so, control passes to step S456, where the smaller one of Da and Db is employed as data D. In this case, D=Db.

This process includes an ANDing operation performed on the data items and corresponds to so-called "obtaining the minimum value of the data items" to thereby obtain a state in which both the input values are satisfied. Thus, the smaller one of data items Da and Db is employed as the determination which the rule C indicates in the current routine. When it is determined that Da<Db, control passes to step S458, where D=Da is employed.

As described above, the two input values (indicative of the aspect ratio and "eyes" position of a face) are evaluated for the rule C to thereby obtain the degree of adaptability to the protasis of the rule C.

At step S460 the address pointer i is reset at "0". At step S462 it is determined whether the address pointer i is equal in value to the end address. If not, at the next step S464 data (on the apodosis) E is read from the YO table of the membership function ROM 22 in which data on the membership function "the face is old-aged" is stored, using i as an address. The data E in this case corresponds to the degree of adaptability of the membership function YO of FIG. 17C and has a value in a range of 0–1. The data E is stored, for example, in another E-register (not shown) in CPU 1.

At step S466 data D and data E are compared. If it is determined that D >E, control passes to step S468, where data E is written into the PC table in the work RAM 8, using i as an address. If it is determined that D≦E, control passes to step S470, where data D is written into the PC table of the work RAM 8, using i as an address. As just described above, the process is performed in which the smaller value is employed to cut the membership function YO.

This process is a so-called head cutting process in which the membership function YO as the apodosis is cut in accordance with the degree of adaptability of the protasis.

At step S472 the value of the address pointer i is incremented by "1" and control then returns to step S462, where a similar process is iterated until the address pointer i is equal in value to the end address, at which time control returns to the age presumption switch interrupt routine of FIG. 21. By incrementing the address value of the address pointer i until the end address is reached, all the membership functions YO are searched.

Thus, the "head cutting process" depending on the degree of adaptability of the protasis is performed on the membership functions YO.

In this way, the operation of the fuzzy rule C is performed on the basis of the aspect ratio and eye position of the created face image to calculate the degree of adaptability of the rule C to the rule "if the aspect ratio of the face is small and the position of the eyes in the face is high, the face is old-aged". The fuzzy inference value "the face is old-aged" is obtained as the magnitude of the head-cut membership function Yo.

Figure 25:
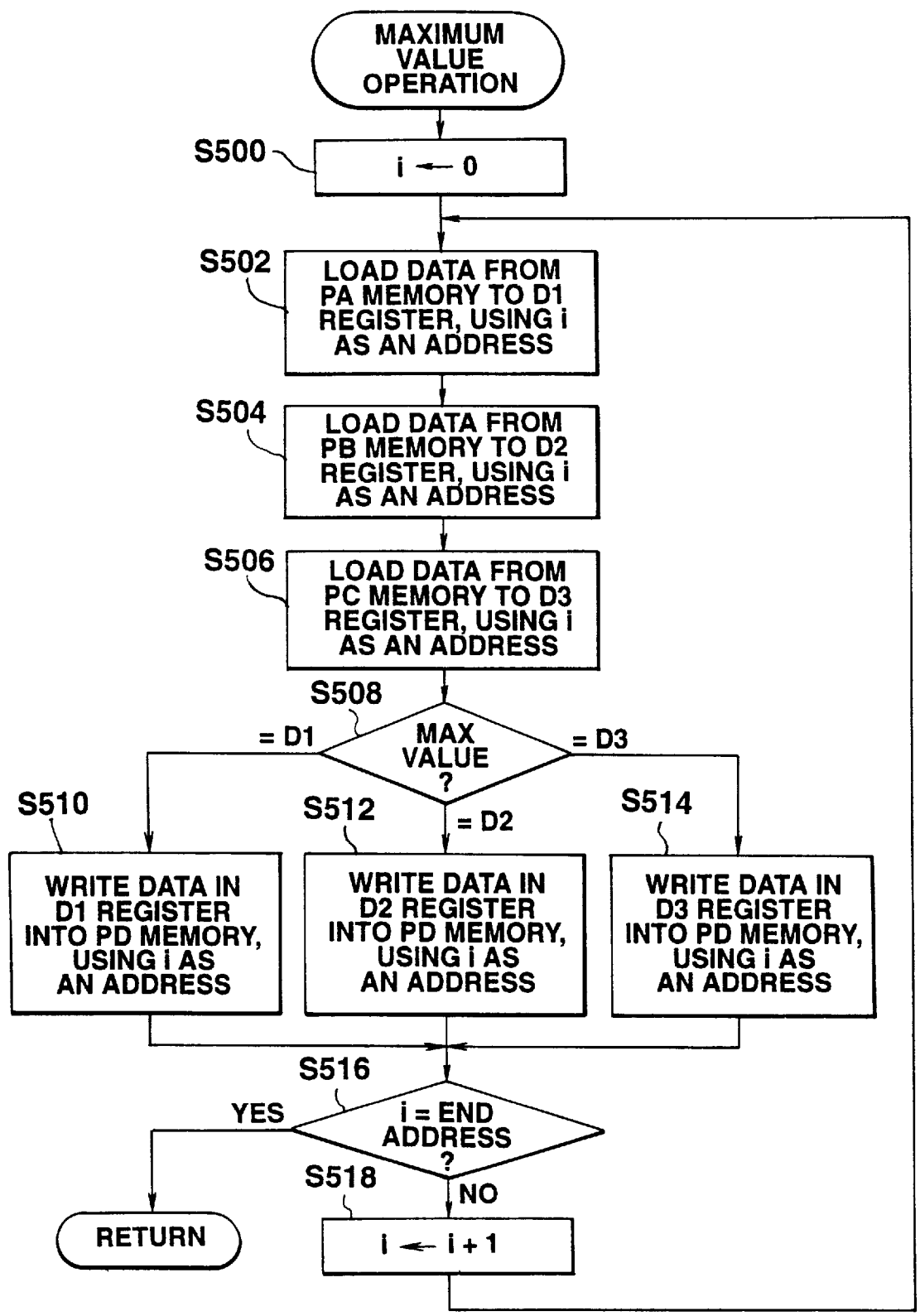
FIG. 25 is a flowchart indicative of a subroutine of a maximum value operation process in the second embodiment.

FIG. 25 is a flowchart indicative of a subroutine of a maximum value operating process. First, at step S500 the value of the address pointer i is reset at "0". At step S502 data D1 is read from the PA memory of the work RAM 8, using as an address the value of the address pointer i. The data D1 is loaded on a D1-register (not shown).

The data D1 is the result of an operation for the fuzzy rule A and is obtained specifically as follows: First, the degree of adaptability of the rule A "if the aspect ratio of the face is large and the position of the eyes is low, the face is young-aged" to the input is calculated in the routine of FIG. 22. D1 is then obtained from the head-cut membership funcition YY on the basis of the degree of adaptability of te rule A.

At step S504 data D2 is read from the PB memory in the work RAM 8, using as an address the value of the address pointer i and loaded on a D2-register (not shown). The data D2 is the result of an operation for the fuzzy rule B and is obtained specifically as follows: First, the degree of adaptability of the rule B "if the aspect ratio of the face is medium and the position of the eyes is medium, the face is middle-aged"to the input is calculated in the routine of FIG. 23. D2 is then obtained from the head-cut membership function YM the basis of the degree of adaptability of the rule B.

At step S506 data D3 is read from the PC memory in the work RAM 8, using as an address the value of the address pointer i and loaded on a D3-register (noto shown). The data D3 is the result of an operation for the fuzzy rule C and is obtained specifically as follows: First, the degree of adaptability of the rule C "if the aspect ratio of the face is small and the position of the eyes is high, the face is old-aged" to the input is calculated in the routine of FIG. 24. D3 is then obtained from the head-cut membership function YO on the basis of the degree of adaptability of the rule C.

Then, at step S508 the maximum value of the respective data items D1–D3 is determined, in accordance with the result of the determination of which control passes to the appropriate one of steps S510, S512 and S514.

The reason for determination of the maximum value is to perform the ORing operation on the results of inference for the respective fuzzy rules A–C for uniting purposes. The maximum value determining process corresponds to a process for so-called "obtaining a maximum value".

More specifically, the maximum value determining process satisfies a request that any of the fuzzy rules A–C which would even a little influence on a face image should be reflected on the evaluation of age presumption, which is the basic way of thought related to the "ORing logic". This thought is to "obtain the sum" in a set theory. In this embodiment, so long as at least one of the rules influences on the face image, it is handled as an object to be considered and the above process is performed.

At step S510 the contents (data D1) of the register D1 are written into the PD memory of the work RAM 8, using the value of the address pointer i as-an address. Thus, part of the head-cut membership function YY as the result of the operation of the fuzzy rule A designated by the value of the current address pointer i (i=0 in the first routine) is written into the PD memory.

As will be described later, by incrementing the value of the address pointer i to the end address, the whole head-cut membership function YY is searched and written into the PD memory.

At step S512 the contents (data D2) of the register D2 are written into the PD memory of the work RAM 8, using the value of the address pointer i as an address. Thus, part of the head-cut membership function YM as the result of the operation of the fuzzy rule B designated by the current value of the address pointer i is written into the PD memory.

Similarly, at step S514 the contents (data D3) of the register D3 are written into the PD memory of the work RAM 8, using the value of the address pointer i as an address. Thus, part of the head-cut membership function YO as the result of the operation of the fuzzy rule C designated by the current value of the address pointer i is written into the PD memory.

At step S516 it is determined whether or not the address pointer is equal in value to the end address. If not, at the next step S518 the address pointer i is incremented by "1" and control then returns to step S502. At step S516 the above process is iterated until the address pointer i is equal in value to the end address, at which time control returns to the age presumption switch interrupt routine of FIG. 21.

By incrementing the value of the address pointer until the address pointer i is equal in value to the end address, all the head-cut membership functions YY, YM, YO are searched and written as data D4 into the PD memory.

In this way, the ORing process for "obtaining a maximum value" is performed to unite the respective results of the inference for the fuzzy rules A–C and the head-cut membership functions YY, YM, YO are ORed. That is, the maximum value operation process superposes the results of the inference of the respective fuzzy rules A–C to produce a maximum value output of the results.

Figure 26:
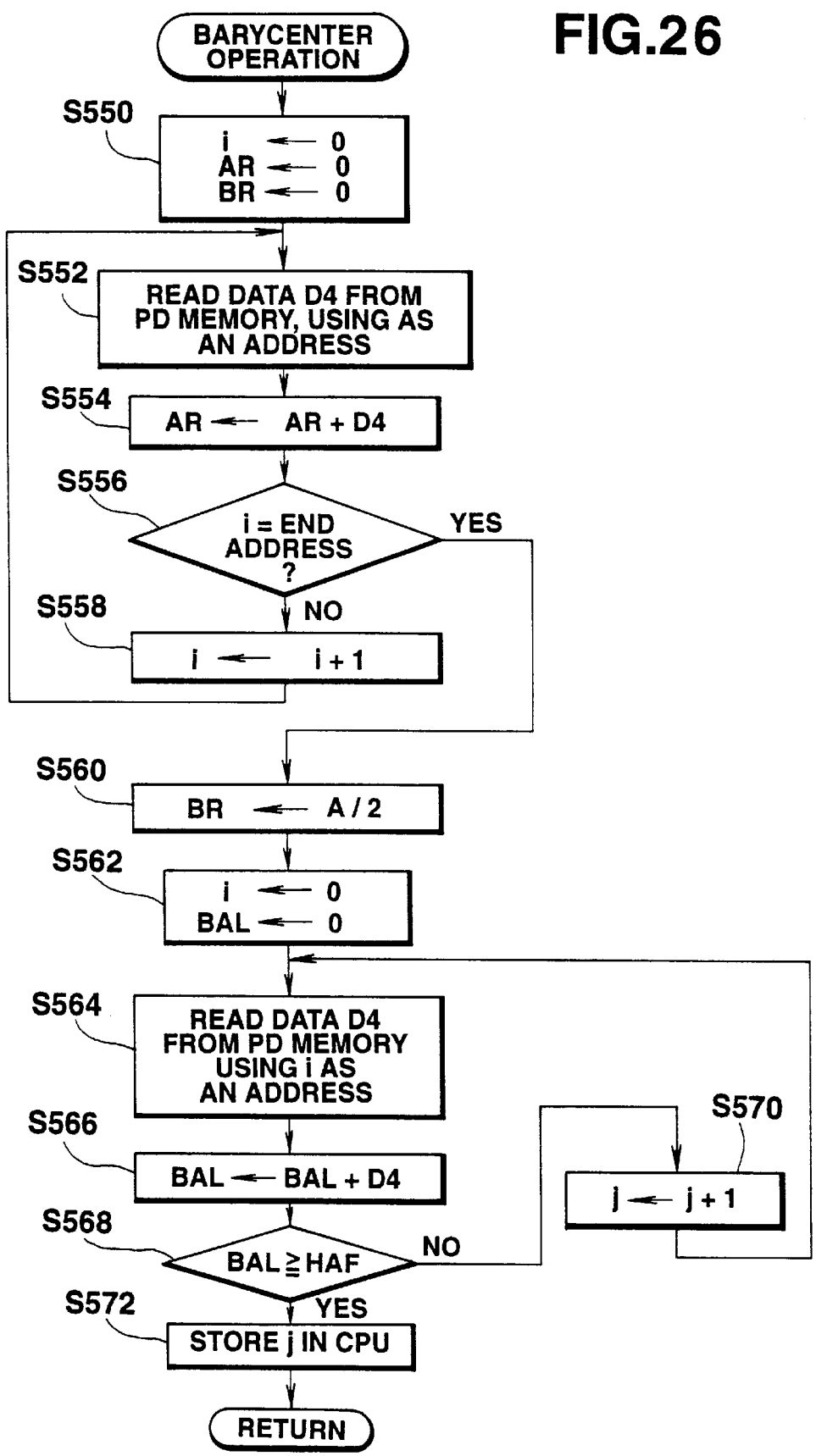
FIG. 26 is a flowchart indicative of a subroutine of a barycenter calculation process in the second embodiment.

FIG. 26 is a flowchart indicative of a subroutine for a barycenter calculation process. First, at step S550 the address pointer i, an area register AR and a barycenter register BR are set to "0". The area register AR stores data on an area required for the barycenter calculation while the barycenter register BR stores a barycenter value BV required for the barycenter calculation.

At step S552 data D4 is read from the PD memory of the work RAM 8, using the value of the address pointer i as an address. The data D4 is a part of the result of an ORing operation (using i as an address) oh the membership functions YY, YM and YO the heads of which are cut, in the maximum value operation process. In other words, it is a part of an output data (expressed as an ORing function) including the superposition of the results of the inference of the respective fuzzy rules A–C superposed in the maximum value operating process.

This time, part of the output data from the PD memory is read, using i (i=0 in the first routine) as an address. As will be described later, by incrementing the value of the address pointer i sequentially until the end address, the whole output data is all searched and read.

At the next step S554 the value of the area register AR is incremented by the value of the output data D4 read this time to calculate the integrated value A of the areas.

At step S556 it is determined whether the-address pointer i is equal in value to the end address. If not, at the next step S558 the address pointer i is incremented by "1" and control returns to step S552. At step S556 the above process is iterated until the address pointer i is equal in value to the end address, at which time control passes to step S560.

By incrementing the address pointer i until the address pointer i is equal in value to the end address, the ORed output data of the head-cut membership functions YY, YM, YO are all searched and read.

At step S560 data on the value of half of the integrated area A is stored as a barycenter value HAF in the barycenter register BR. Then at step S562 j corresponding to the transverse axis of the ORing function of the membership functions YY, YM, YO and the integrated area BAL are both reset at "0". Data items on the values of j and BAL are stored, for example, in j-and BAL-registers (not shown), respectively.

At step S564 data D4 corresponding to the ORing function is read from the PD memory of the work RAM 8, using the transverse axis j as an address. At the next step S566 the value of the integrated area BAL is incremented by the value of the data D4 read this time to calculate the integrated area BAL.

At step S568 the integrated area value BAL is compared with the barycenter value HAF. When the integrated area BAL is determined to be smaller than the barycenter value HAF, control passes to step S570, where control increments the transverse axis value j, and returns to step S564. At step S568 the above process is repeated until the integrated area value BAL exceeds the barycenter value HAF, at which time control determines that the transverse axis value i is equal to the barycenter value. Control then passes to step S572 where the transverse axis value j is stored as a presumed age in the presumption age register 25 of CPU 1 and control returns to the age presumption switch interrupt routine of FIG. 21.

In this way, the barycenter value of the ORing function is taken and a defuzzificating process in which the barycenter value is handled as a representative of the result of the ORing operation is performed to calculate the whole conclusion in the inference process as one fixed value or, in this case, a presumed value of the age, which can be displayed as presumed age data j on the display 11, as shown in FIG. 27D.

As described above, according to the present embodiment, if the age of a face image created by the operation of the cursor switch 3, the position correction switch 16, etc., is desired to be known, the age presumption switch 17 is required to be operated to thereby detect face characteristic data (in this embodiment, the aspect ratio of the face and the position of its "eyes") corresponding to the created face image. Fuzzy inference is performed in conformity to the fuzzy rules A–C, using the values of the results of the detection as input parameters. Thus, the age of the created face image is presumed on the basis of the results of the inference. Therefore, presumed age data j corresponding to the presumed age is displayed on the display 11 along with the respective already created face images G2, G3 and the actual beforehand input age data z, as shown in FIGS. 27D and 27E.

Thus, the presumed age data j of the created face images G2 and G3 can be presumed easily, as shown in FIGS. 27D and 27E, without requiring any special skills. Also, as shown in FIGS. 27D and 27E, the actual age data z inputted by the age data input switch 5 for the created face images G2 and G3 is displayed along with the presumed age data j of the face image F1 in a juxtaposed manner. Thus, data z on the actual age of the same face image G2 and the presumed age data j presumed from the face image F1 can be compared on the basis of the same face image G2. It can be determined on the basis of the result of the comparison whether the user's or another's created face image looks young compared to his actual age.

Since in the particular embodiment an age is presumed in fuzzy inference, no immense amount of process is required in the presuming operation to thereby reduce the load of the operation. As a result, the operation is easily performed by the existing CPU. Thus, a high-grade function age presuming device is realized at low cost.

In the above embodiment, the cursor switch 3 is first operated to select part patterns stored in the part pattern ROM M7. An image is created by a combination of those part patterns. Thereafter, the position of any part pattern is, for example, corrected by the operation of the position correction switch 16 as required to finish the face image. Face characteristic data such as the aspect ratio of the completed face image and the position of its eyes are detected on the basis of that completed face image. Fuzzy inference is performed on the basis of the detected face characteristic data to thereby presume the age of the face image. Alternatively, for example, data on the face image picked up by a CCD camera 20 may be stored temporarily in the face image RAM 21, face characteristic data such as the aspect ratio of the face and the position of its eyes may be detected on the basis of the stored face image data; and fuzzy inference is performed on the basis of the face characteristic data to presume the age of the face image.

While in the above embodiment face characteristic data indicative of the aspect ratio of a pre-created face image and the position of its eyes are used as input parameters for the fuzzy inference to presume the age of the face image in the fuzzy inference, other face characteristic data such as the number of wrinkles on the face and the degree of upward progress of retreat of the border of the hair (degree of upward baldness of the head) may be used as input parameters for the fuzzy inference.

While in the embodiment the fuzzy inference is realized by software, using CPU 1 and the membership function ROM 22, it may be realized by hardware, using a fuzzy chip, for example.

The value of the membership function used in the fuzzy inference may be set appropriately depending on a face image as a target, face characteristic data, etc., to thereby improve the accuracy of the age presumption.

Fuzzy inference may be performed, using beforehand prepared membership function ROMs corresponding to respective faces for sexes, human races, and eras, to presume the respective ages of created face images for the sexes, human races and eras from their face images.

While in the embodiment the age of a face image created by the user is presumed, using the face image, it may be presumed using the already recorded face image.

Another person's created face image may be recorded as individual's data along with the age presumed in the process in the present embodiment.

As shown in FIGS. 27A through 27E, while in the above embodiment the face images G1–G3 created by the user, actual age data z, and presumed age data j are displayed on the display 11, they may be printed by a printer 13 along with or in place of the display of the respective face images.

The face images G1–G3 created by the user, actual age data z, and presumed age data j may be recorded in a storage such as a RAM along with individual's data (names, addresses, telephone numbers, etc.) related to the face images G1–G3.

As described above, according to the second embodiment, fuzzy inference is executed on the basis of the displayed face image. As a result, data on the age of the face image is output. Thus, the age of the displayed face image can be presumed easily and rapidly without requiring any special skills.

Generally, although we have ability to roughly predict a person's age by viewing his face, we sometimes want to objectively confirm whether our faces are close/greatly remote in age to/from an average person's face from a view point of management of out health. In criminal investigation, the age of a criminal is often desired to be presumed from his photomontage composed by a witness of the criminal to effectuate an arrest of the criminal actually. According to this invention, the age of a created face image can be presumed objectively and rapidly from the face image. Also, according to this invention, the result of comparison of the presumed and actual ages is easily known.

What is claimed is:

1. An animal image display control device which sequentially displays an animal image and said animal's age, comprising:

image storage means in which an animal image is stored;

a display for displaying the animal image and the animal's age;

a time counter for counting the current time;

age storage means for renewing a predetermined age sequentially in units of one year on the basis of both the current time counted by said time counter and predetermined reference data end for storing the renewed age;

age display control means for controlling said display so as to display sequentially in units of one year the age stored in said age storage means;

image display control means for changing the animal image stored in said image storage means to an animal image corresponding to the age displayed sequentially in units of one year under control of said age display control means, and for controlling said display so as to display the changed animal image; and said image storage means and said display being beforehand connected to said age display control means and said image display control means.

2. The animal image display control device according to claim 1, further comprising:

an externally operable switching section which is operable by a user;

and wherein said age display control means is responsive to said externally operable switching section being operated for controlling said display so as to display the age stored in said age storage means.

3. The animal image display control device according to claim 1, further comprising:

an externally operable switching section which is operable by a user;

and wherein said image display control means is responsive to said externally operable switching section being operated for changing the animal image stored in said image storage means to an animal image corresponding to the age displayed by said display control means, and for controlling said display so as to display the changed animal image.

4. The animal image display control device according to claim 1, wherein said image display control means comprises:

writing means for changing the animal image stored in said image storage means to an animal image corresponding to the age displayed on said display under control of said age display control means, and for writing the changed animal image into said image storage means; and control means for controlling said display so as to display the changed animal image written into said image storage means by said writing means.

5. The animal image display control device according to claim 1, wherein said image storage means comprises a semiconductor memory.

6. The animal image display control device according to claim 1, wherein said display comprises a liquid crystal display for displaying with liquid crystals the animal image stored in said image storage means.

7. The animal image display control device according to claim 1, wherein said animal image comprises a plurality of combined part images.

8. An animal image display control device which sequentially displays an animal image and said animal's age, comprising:

image storage means in which an animal image is stored;

a display for displaying the animal image and the animal's age;

a time counter for counting time;

age storage means for renewing a predetermined age sequentially in units of one year in accordance with a lapse of the time counted by said time counter, and for storing the renewed age;

age display control means for controlling said display so as to display sequentially in units of one year the age stored in said age storage means;

image display control means for changing the animal image stored in said image storage means to an animal image corresponding to the age displayed sequentially in units of one year under control of said age display control means, and for controlling said display so as to display the changed animal image; and said image storage means and said display being beforehand connected to said age display control means and said image display control means.

9. The animal image display control device according to claim 8, further comprising:

an externally operable switching section which is operable by a user;

and wherein said age display control means is responsive to said externally operable switching section being operated for controlling said display so as to display the age stored in said age storage means.

10. The animal image display control device according to claim 8, further comprising:

an externally operable switching section which is operable by a user;

and wherein said image display control means is responsive to said externally operable switching section being operated for changing the animal image stored in said image storage means to an animal image corresponding to the age displayed under control of said display control means, and for controlling said display so as to display the changed animal image.

11. The animal image display control device according to claim 8, wherein said image display control means comprises:

writing means for changing the animal image stored in said image storage means to an animal image corresponding to the age displayed on said display under control of said age display control means, and for writing the changed animal image into said image stored means; and control means for controlling said display so as display the changed animal image written into said image storage means by said writing means.

12. The animal image display control device according to claim 8, wherein said image storage means comprises a semiconductor memory.

13. The animal image display control device according to claim 8, wherein said display comprises a liquid crystal display for displaying with liquid crystals the animal image stored in said image storage means.

14. The animal image display control device according to claim 8, wherein said animal image comprises a plurality of combined part images.

15. An animal image display method which sequentially displays an animal image and said animal's age, comprising the steps of:

storing the animal image in image storage means;

counting the current time;

renewing a predetermined age sequentially in units of one year on the basis of both the current time counted by said time counting step and predetermined reference data, and storing the renewed age;

displaying sequentially in units of one year the age stored in said renewed age storing step;

changing the animal image stored in the image storage means to an animal image corresponding to the age displayed sequentially in units of one year; and displaying the changed animal image.

16. An animal image display method which sequentially displays an animal image and said animal's age, comprising the steps of:

storing the animal image in image storage means;

counting time;

renewing a predetermined age sequentially in units of one year in accordance with a lapse of the time counted by said time counting step, and storing the renewed age;

displaying sequentially in units of one year the age stored in said renewed age storing step;

changing the animal image stored in the image storage means to an animal image corresponding to the age displayed sequentially in units of one year; and displaying the changed animal image.

17. A recording medium which contains a computer readable animal image display program for causing a computer to sequentially display an animal image and said animal's age, the display program causing the computer to realize the functions of:

storing an animal image in image storage means;

counting the current time;

renewing a predetermined age sequentially in units of one year on the basis of both the current time counted by said time counting step and predetermined reference data, and storing the renewed age;

displaying sequentially in units of one year the age stored in said renewed age storing step;

changing the animal image stored in the image storage means to an animal image corresponding to the age displayed sequentially in units of one year; and displaying the changed animal image.

18. A recording medium which contains a computer readable animal image display program for causing a computer to sequentially display an animal image and said animal's age, the display program causing the computer to realize the functions of:

storing an animal image in image storage means;

counting time;

renewing a predetermined age sequentially in units of one year in accordance with a lapse of the time counted by said time counting step, and storing the renewed age;

displaying sequentially in units of one year the age stored in said renewed age storing step; and changing the animal image stored in the image storage means to an animal image corresponding to the age displayed sequentially in units of one year; and displaying the changed animal image.

* * * * *